(12) United States Patent
Hu et al.

(10) Patent No.: US 11,689,788 B2
(45) Date of Patent: Jun. 27, 2023

(54) OPTICAL ELEMENT DRIVING MECHANISM

(71) Applicant: TDK TAIWAN CORP., Taoyuan (TW)

(72) Inventors: Chao-Chang Hu, Taoyuan (TW);
Shu-Shan Chen, Taoyuan (TW);
Chen-Hsien Fan, Taoyuan (TW);
Yueh-Lin Lee, Taoyuan (TW);
Yu-Chiao Lo, Taoyuan (TW);
Sung-Mao Tsai, Taoyuan (TW);
Shang-Hung Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 321 days.

(21) Appl. No.: 16/844,092

(22) Filed: Apr. 9, 2020

(65) Prior Publication Data
US 2020/0393639 A1 Dec. 17, 2020

Related U.S. Application Data

(60) Provisional application No. 62/861,440, filed on Jun. 14, 2019.

(30) Foreign Application Priority Data

Feb. 3, 2020 (CN) .......................... 202020150526.9

(51) Int. Cl.
*G02B 7/09* (2021.01)
*G02B 27/64* (2006.01)
(Continued)

(52) U.S. Cl.
CPC ............. *H04N 23/51* (2023.01); *G02B 7/005* (2013.01); *G02B 7/026* (2013.01); *G02B 7/04* (2013.01);
(Continued)

(58) Field of Classification Search
CPC . G03B 5/00; G03B 5/04; G03B 13/36; G03B 2205/0007; G03B 2205/0053; G03B 2205/0069; G03B 3/02; G03B 3/10; G03B 30/00; G02B 7/021; G02B 7/08; G02B 7/09; G02B 7/10; G02B 9/62; G02B 13/001; G02B 13/0065; G02B 26/02; G02B 27/646; H04N 5/2253; H04N 5/2262;
(Continued)

(56) References Cited

U.S. PATENT DOCUMENTS

| 2013/0076924 | A1* | 3/2013 | Wade | ........................ G03B 5/02 |
| | | | | 348/208.11 |
| 2014/0160311 | A1* | 6/2014 | Hwang | ................ G02B 27/646 |
| | | | | 348/208.99 |

(Continued)

*Primary Examiner* — Marin Pichler
(74) *Attorney, Agent, or Firm* — Muncy, Geissler, Olds & Lowe, P.C.

(57) ABSTRACT

An optical element driving mechanism is provided, including a movable portion, a fixed portion, a driving assembly, and a support element. The movable portion is used for connecting to an optical element having a main axis. The movable portion is movable relative to the fixed portion. The driving assembly is used for driving the movable portion to move relative to the fixed portion. The movable portion moves relative to the fixed portion through the support element.

18 Claims, 25 Drawing Sheets

(51) Int. Cl.

| | |
|---|---|
| *H04N 23/51* | (2023.01) |
| *G02B 7/00* | (2021.01) |
| *G03B 5/04* | (2021.01) |
| *G02B 7/04* | (2021.01) |
| *H02K 11/21* | (2016.01) |
| *G02B 26/02* | (2006.01) |
| *G02B 7/02* | (2021.01) |
| *G02B 7/08* | (2021.01) |
| *G03B 3/10* | (2021.01) |
| *G03B 5/02* | (2021.01) |
| *H02N 2/04* | (2006.01) |
| *G03B 13/36* | (2021.01) |
| *H04N 23/55* | (2023.01) |
| *H04N 23/57* | (2023.01) |
| *H04N 23/60* | (2023.01) |

(52) U.S. Cl.
CPC ............... *G02B 7/08* (2013.01); *G02B 7/09* (2013.01); *G02B 26/02* (2013.01); *G02B 27/646* (2013.01); *G03B 3/10* (2013.01); *G03B 5/02* (2013.01); *G03B 5/04* (2013.01); *G03B 13/36* (2013.01); *H02K 11/21* (2016.01); *H02N 2/043* (2013.01); *H04N 23/55* (2023.01); *H04N 23/57* (2023.01); *H04N 23/60* (2023.01); *G03B 2205/0015* (2013.01); *G03B 2205/0053* (2013.01); *G03B 2205/0061* (2013.01); *G03B 2205/0069* (2013.01)

(58) Field of Classification Search
CPC .... H04N 5/2254; H04N 5/2257; H04N 5/232; H04N 5/23287; H02K 11/33; H02K 41/0356
USPC ....... 359/359, 911, 554, 555, 557, 811, 813, 359/814, 824, 872, 877
See application file for complete search history.

(56) References Cited

U.S. PATENT DOCUMENTS

2017/0254979 A1* 9/2017 Bai .................... G02B 7/10
2017/0363881 A1* 12/2017 Stec ................... G02B 7/00

* cited by examiner

OPTICAL ELEMENT DRIVING MECHANISM

CROSS REFERENCE TO RELATED APPLICATIONS

This application claims the benefit of U.S. Provisional Application No. 62/861,440, filed on Jun. 14, 2019, and China Patent Applications No. 202020150526.9, filed on Feb. 3, 2020, which are incorporated by reference herein in their entirety.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability have become important issues.

BRIEF SUMMARY OF DISCLOSURE

An optical element driving mechanism is provided, including a movable portion, a fixed portion, a driving assembly, and a support element. The movable portion is used for connecting to an optical element having a main axis. The movable portion is movable relative to the fixed portion. The driving assembly is used for driving the movable portion to move relative to the fixed portion. The movable portion moves relative to the fixed portion through the support element.

In some embodiments, the driving assembly includes a first magnetic element disposed on the movable portion, and a second magnetic element disposed on the fixed portion. In some embodiments, the first magnetic element extends in a direction that is perpendicular to the main axis. In some embodiments, the optical element driving mechanism further includes a resilient element connected to the movable portion and the fixed portion. In some embodiments, the resilient element is S-shaped. In some embodiments, the resilient element is positioned on a plane that is parallel to the main axis. In some embodiments, the fixed portion has a recess, and a portion of the resilient element is disposed in the recess. In some embodiments, the fixed portion has a top surface and a bottom surface, the minimum distance between the top surface and the movable portion is less than the minimum distance between the bottom surface and the movable portion, and the minimum distance between the bottom surface and the resilient element is less than the minimum distance between the bottom surface and the movable portion. In some embodiments, the resilient element does not overlap the driving assembly along the main axis.

In some embodiments, the optical element driving mechanism further includes two resilient elements disposed on opposite sides of the fixed portion. In some embodiments, the main axis is positioned between the two resilient elements. In some embodiments, the driving assembly does not overlap the optical element in a direction that is perpendicular to the main axis. In some embodiments, the optical element driving mechanism further includes a magnetic permeable element disposed in the fixed portion. In some embodiments, the driving assembly includes a first magnetic element disposed on the movable portion, and a second magnetic element disposed on the fixed portion, and the magnetic permeable element, the first magnetic element, and the second magnetic element at least partially overlap each other along the main axis.

In some embodiments, the optical element driving mechanism further includes at least two position sensors disposed on the fixed portion or the movable portion. In some embodiments, the fixed portion includes a case, and the movable portion is disposed in the case. In some embodiments, the support element is spherical, and is connected to the movable portion and the fixed portion. In some embodiments, the movable portion has a recess, the fixed portion has a concave portion, and the support element is partially disposed in the recess of the movable portion and in the concave portion of the fixed portion. In some embodiments, the fixed portion includes a convex portion extending to the movable portion, and the concave portion is positioned in the convex portion. In some embodiments, the driving assembly includes a first magnetic element disposed on the movable portion, and a second magnetic element disposed on the fixed portion, and the distance between the second magnetic element and the movable portion is less than the distance between the convex portion and the movable portion.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
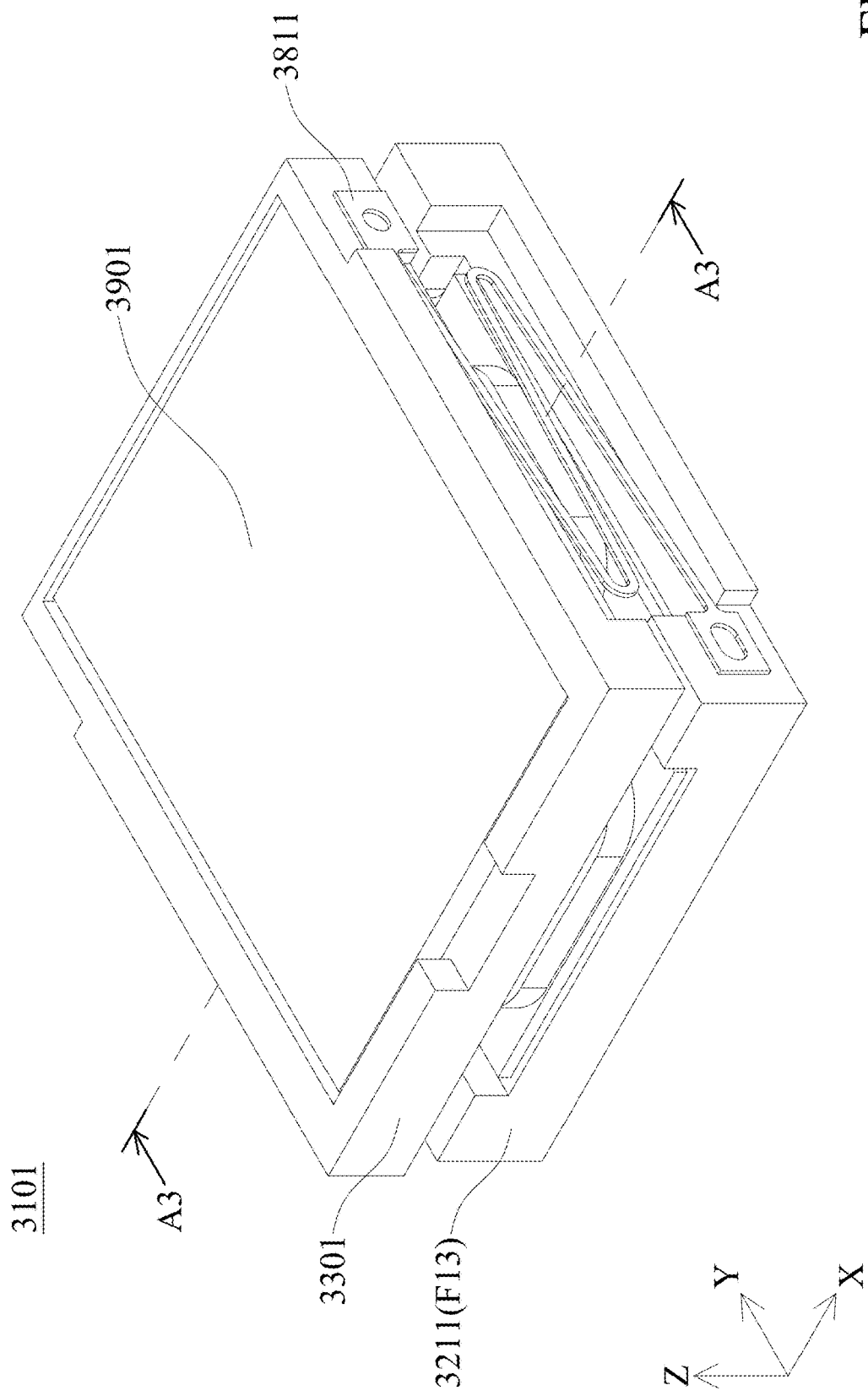
FIG. 1 is a perspective view of an optical element driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
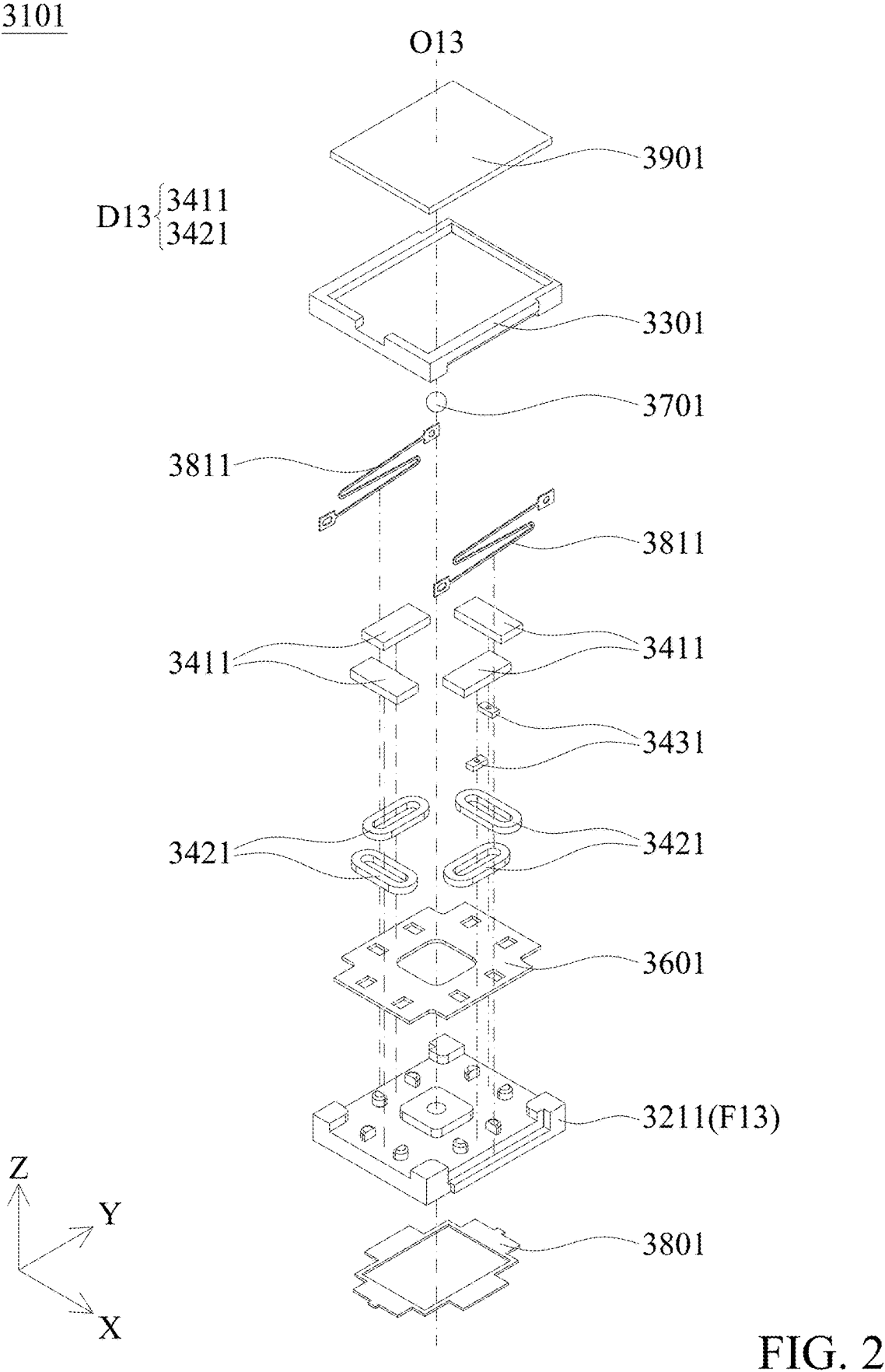
FIG. 2 is an exploded view of the optical element driving mechanism.
Figure 3:
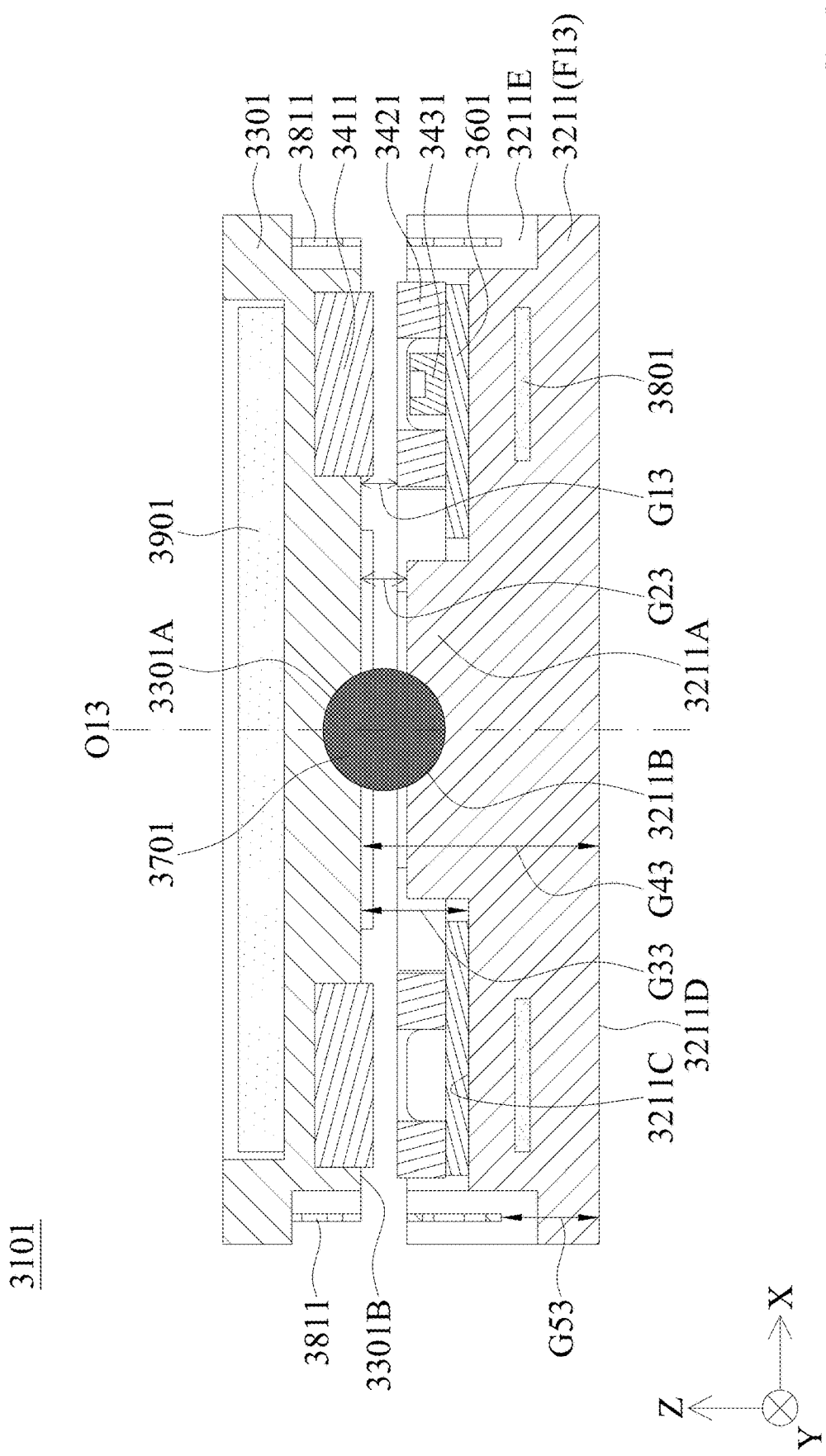
FIG. 3 is a cross-sectional view of the optical element driving mechanism.

In some embodiments of the present disclosure, FIG. 1 to FIG. 3 are a perspective view and an exploded view of an optical element driving mechanism 3101, and a cross-sectional view illustrated along a line A3-A3 in FIG. 1, respectively. In FIG. 2, the optical element driving mechanism 3101 mainly includes a base 3211 (also referred to as a fixed portion F13), a movable portion 3301, a first magnetic element 3411, a second magnetic element 3421, a position sensor 3431, a circuit board 3601, a support element 3701, a magnetic permeable element 3801, and resilient elements 3811. The optical element driving mechanism 3101 may be used for driving an optical module 3901, or it may be used for driving various optical elements, such as a lens, a mirror, a prism, a beam splitter, or an aperture.

In some embodiments, the first magnetic element 3411 and the second magnetic element 3421 may serve as a driving assembly D13 to drive the movable portion 3301 to move relative to the fixed portion F13. For example, the first magnetic element 3411 and the second magnetic element 3421 may include a combination of a driving coil and a driving magnet. For example, the first magnetic element 3411 may be a driving magnet, and the second magnetic element 3421 may be a driving coil. In another example, the first magnetic element 3411 may be a coil, and the second magnetic element 3421 may be a driving magnet, and is not limited thereto. The first magnetic element 3411 and the second magnetic element 3421 may be positioned on the fixed portion F13 and the movable portion 3301, respectively. In some embodiments, the positions of the fixed portion F13 and the movable portion 3301 may be interchanged, depending on design requirement. As a result, the movable portion 3301 may be moved relative to the fixed portion F13 through the driving assembly D13, and the optical module 3901 disposed on the movable portion 3301 may also be moved with the movable portion 3301 to achieve auto focus (AF) or optical image stabilization (OIS). In some embodiments, the driving assembly D13 may include other driving elements, such as piezoelectric elements, shape memory alloys, etc.

In some embodiments, the first magnetic element 3411 may extend in a direction that is perpendicular to the main axis O13, such as the X axis or Y axis, to allow the movable portion 3311 rotate relative to the X axis or Y axis. In some embodiments, as shown in FIG. 3, the driving assembly D13 and the optical module 3901 do not overlap each other in a direction that is perpendicular to the main axis O13 to achieve miniaturization. It should be noted that the interaction between the first magnetic element 3411 and the second magnetic element 3421 may create a magnetic force to move the optical module 3901 relative to the fixed portion F13, so auto focus (AF) or optical image stabilization (OIS) may be achieved.

Furthermore, the circuit board 3601 may, for example, be a flexible printed circuit, which may be affixed to the fixed portion F13 by adhesion. In some embodiments, the circuit board 3601 is electrically connected to other electronic elements disposed inside or outside the optical element driving mechanism 3101. For example, the circuit board 3601 may send electric signals to the driving assembly D13 to control the movement of the movable portion 3301. In some embodiments, the circuit board 3601 may be positioned between the base 3211 and the movable portion 3301 along the Z axis.

In some embodiments, a position sensor 3431 may be disposed in the optical element driving mechanism 3101 to detect the position of the movable portion 3301 relative to the fixed portion F13. The position sensor 3431 may include a Hall sensor, a magnetoresistance effect sensor (MR Sensor), a giant magnetoresistance effect sensor (GMR sensor), a tunneling magnetoresistance effect sensor (TMR sensor), or a fluxgate sensor. For example, a plurality of convex portions 3211F may be positioned on the base 3211, the position sensor 3431 may be positioned between two convex portions 3211F, and the second magnetic element 3421 may surround the two convex portions 3211F and the position sensor 3431 to protect the position sensor 3431.

The support element 3701 may have a spherical shape for connecting the movable portion 3301 and the fixed portion F13 to allow the movable portion 3301 may be moved relative to the fixed portion F13 through the support element 3701. In detail, the movable portion includes a recess 3301A, the base 3211 includes a convex portion 32111A extending to the movable portion 3301 and a concave portion 3211B positioned in the convex portion 3211A. The support element 3701 is partially disposed in the recess 3301A of the movable portion 3301 and the concave portion 3211B of the base 3211 to limit the position of the support element 3701. As shown in FIG. 3, the recess 3301A and the concave portion 3211B has half-spherical shapes, so the spherical support element 3701 may roll in the recess 3301A and the concave portion 3211B, and the friction between the movable portion 3301 and the fixed portion F13 may be reduced. As a result, the movable portion 3301 may rotate relative to the fixed portion F13.

As shown in FIG. 3, the distance between the second magnetic element 3421 and a bottom surface 3301B of the movable portion 3301 is G13, the distance between the convex portion 3211A and the bottom surface 3301B of the movable portion 3301 is G23, and the distance G13 is less than the distance G23. As a result, the electromagnetic forces of the first magnetic element 3411 disposed on the movable portion 3301 and the second magnetic element 3421 disposed on the base 3211 may be increased. Furthermore, the base 3211 has a top surface 3211C and a bottom surface 3211D, the distance G33 between the top surface 3211C and the movable portion 3301 is less than the distance G43 between the bottom surface 3211D and the movable portion 3301, and the distance G53 between the resilient element 3811 and the bottom surface 3211D is less than the distance G43 between the bottom surface 3211D and the movable portion 3301 along the main axis O13. As a result, the size of the optical element driving mechanism 3101 in the main axis O13 may be reduced to achieve miniaturization.

Figure 4:
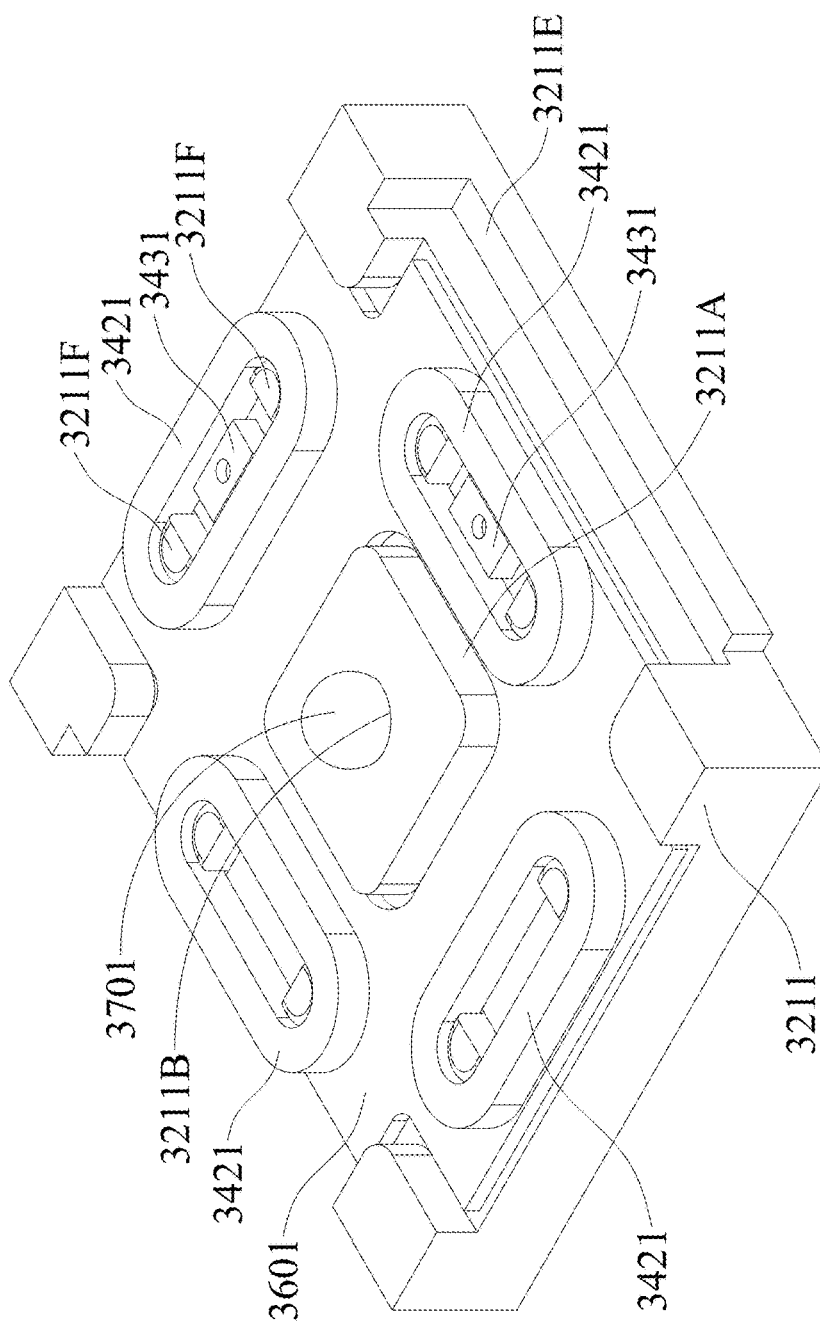
FIG. 4 is a schematic view of some elements of the optical element driving mechanism.
Figure 5:
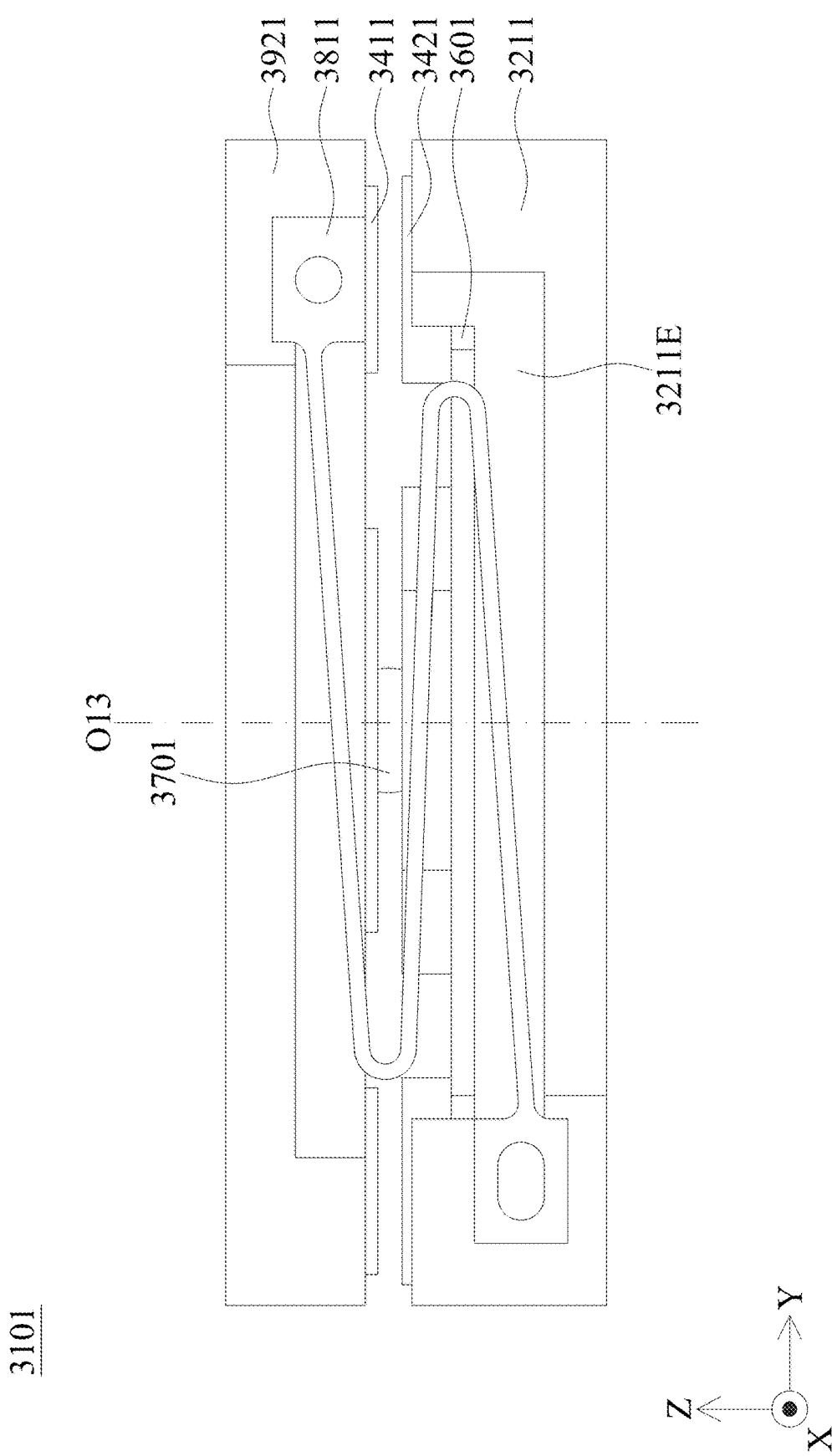
FIG. 5 is a side view of the optical element driving mechanism.

The resilient elements 3811 may be disposed on the sides of the optical element driving mechanism 3101, such as disposed on opposite sides (i.e. the main axis O13 is positioned between the two resilient elements 3811), and may be disposed on a plane that is parallel to the main axis O13. Furthermore, the resilient element 3811 may be S-shaped. The resilient element 3811 may connect the fixed portion F13 (the base 3211) and the movable portion 3301 to restrict the movable range of the movable portion 3301 relative to the fixed portion F13. Moreover, as shown in FIG. 3, FIG. 4, and FIG. 5, the base 3211 may has a recess 3211E, and the resilient element 3811 may be partially disposed in the recess 3211E to protect the resilient element 3811 from being damaged. The resilient elements 3811 does not overlap the driving assembly D13 when viewed along the main axis O13, so the size of the optical element driving mechanism 3101 in Z axis may be reduced.

Furthermore, as shown in FIG. 3, the magnetic permeable element 3801 may be disposed in the base 3211, such as embedded in the base 3211 and does not expose from the base 3211. The magnetic permeable element 3801, the first magnetic element 3411 and the second magnetic element 3421 may at least partially overlap each other along the main axis O13, and the material of the magnetic permeable element 3801 may include metal. As a result, the magnetic field of the first magnetic element 3411 and the second magnetic element 3421 may be adjusted, and miniaturization may be achieved.

Figure 6:
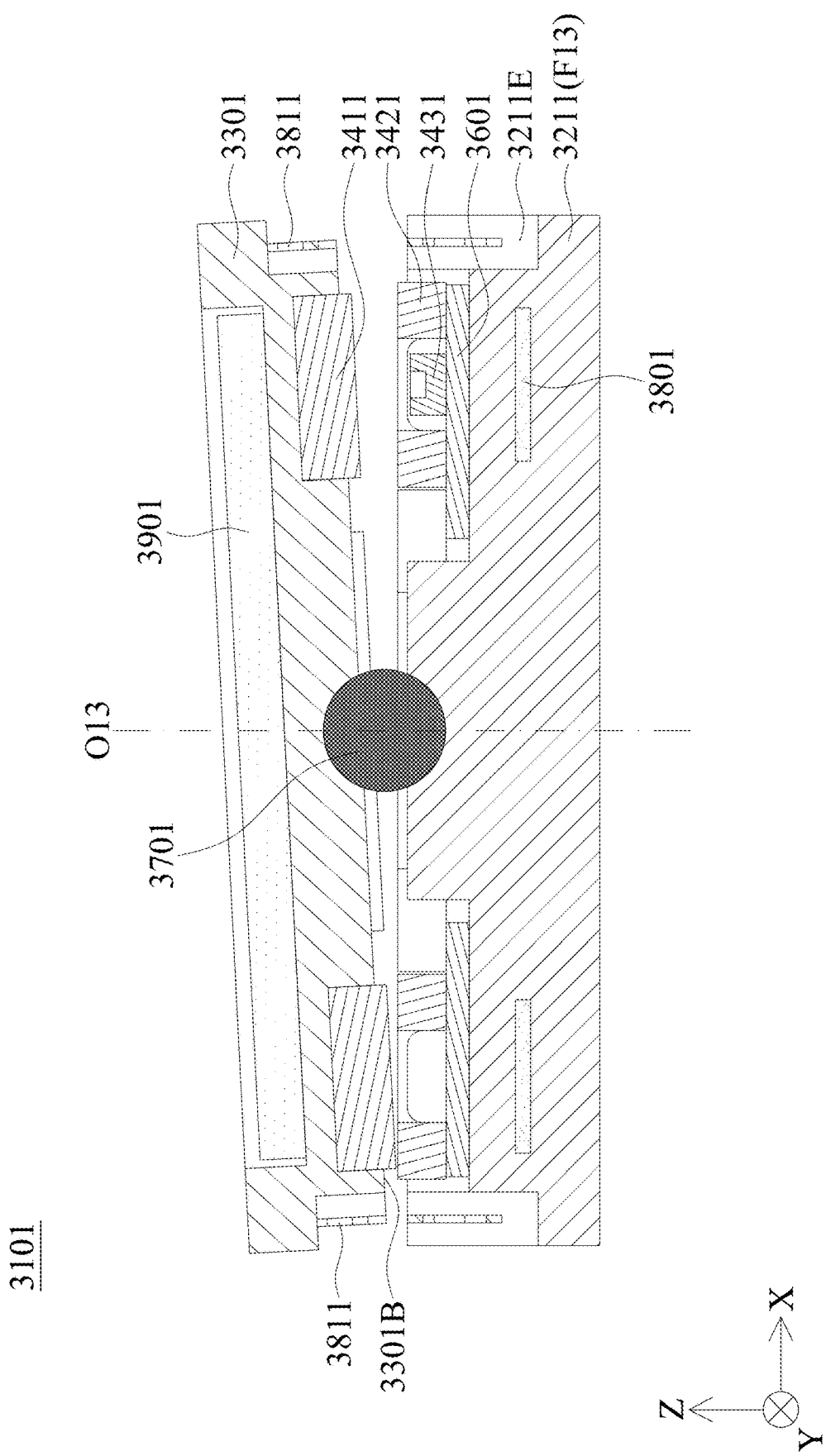
FIG. 6 is a schematic view of the optical element driving mechanism when the optical element driving mechanism is operating.

FIG. 6 is a cross-sectional view of the movable portion 3301 of the optical element driving mechanism 3101 and other elements disposed on the movable portion 3301 when these elements rotate in Y axis relative to the fixed portion. As shown in FIG. 6, the movable portion 3301 and the optical module 3901 disposed on the movable portion 3301 may use the spherical support element 3701 as a fulcrum to rotate in different directions by the force generated from the driving assembly D13. Although the embodiment in FIG. 6 only shows the movable portion 3301 rotating in a single axis, but it should be noted that the movable portion 3301 may rotate in more than one axes, such as X, Y, and Z axes, to achieve optical image stabilization (OIS).

Figure 7:
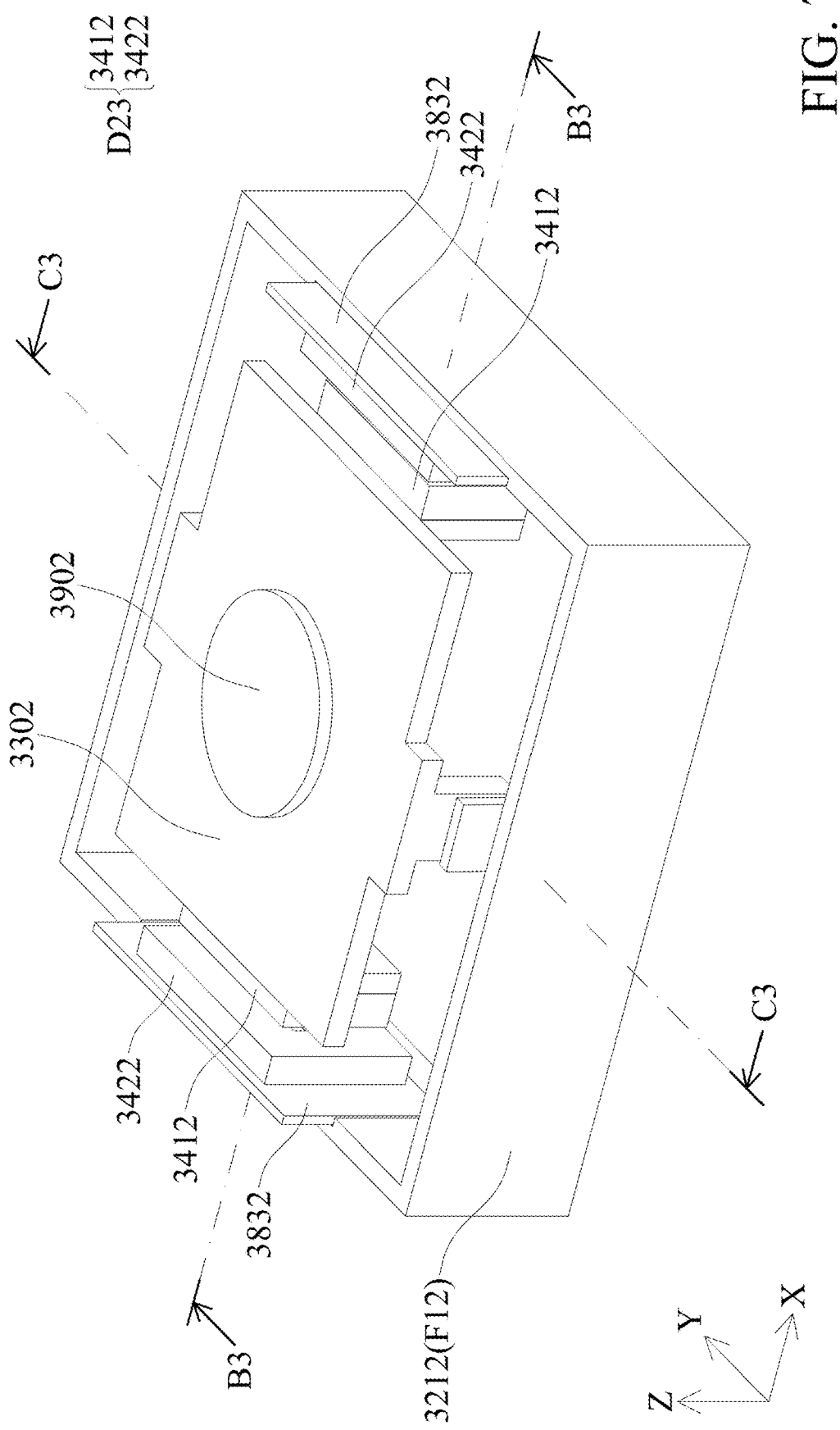
FIG. 7 is a perspective view of an optical element driving mechanism in some embodiments of the present disclosure.
Figure 8:
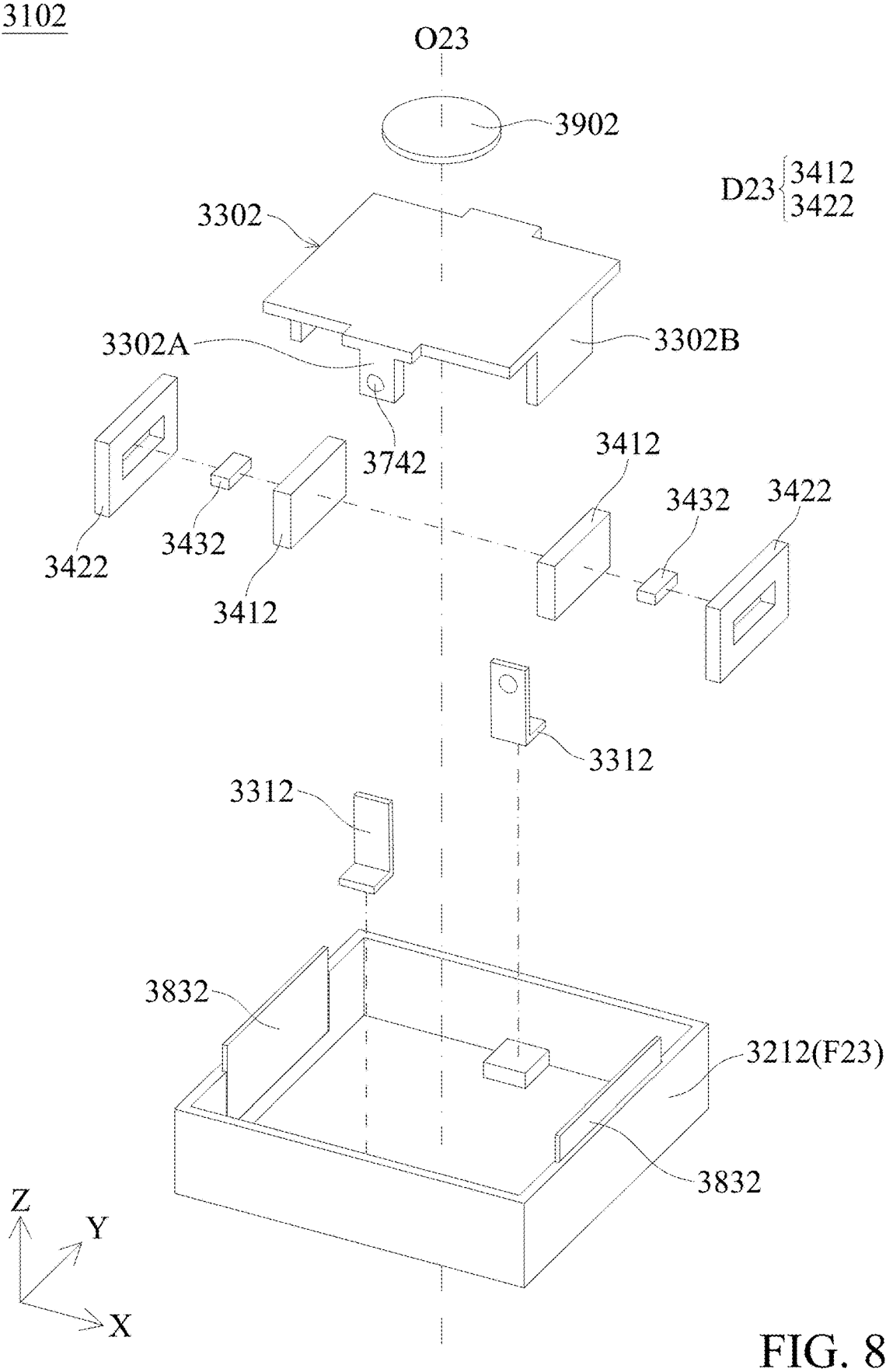
FIG. 8 is an exploded view of the optical element driving mechanism.

In some embodiments of the present disclosure, FIG. 7 to FIG. 10 are a perspective view and an exploded view of an optical element driving mechanism 3102, a cross-sectional view illustrated along a line B3-B3 in FIG. 7, and a cross-sectional view illustrated along a line C3-C3 in FIG. 7, respectively. In FIG. 8, the optical element driving mechanism 3102 mainly includes a base 3212 (also referred to as a fixed portion F23), a movable portion 3302, a connecting element 3312, a first magnetic element 3412, and a second magnetic element 3422. The optical element driving mechanism 3102 may be used for driving an optical module 3902, or it may be used for driving various optical elements, such as a lens, a mirror, a prism, a beam splitter, or an aperture.

Figure 10:
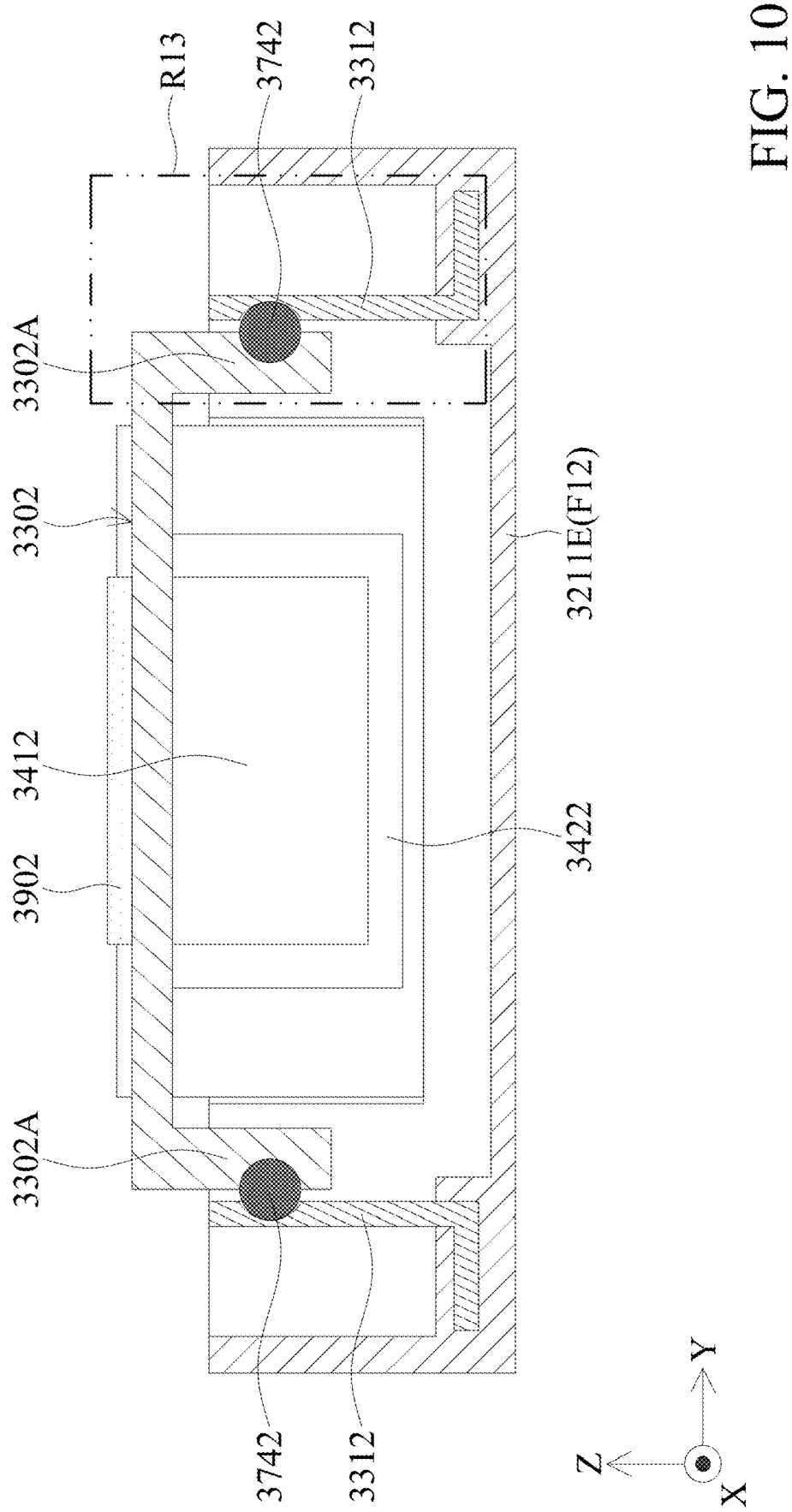
FIG. 10 is a cross-sectional view of the optical element driving mechanism.
Figure 11:
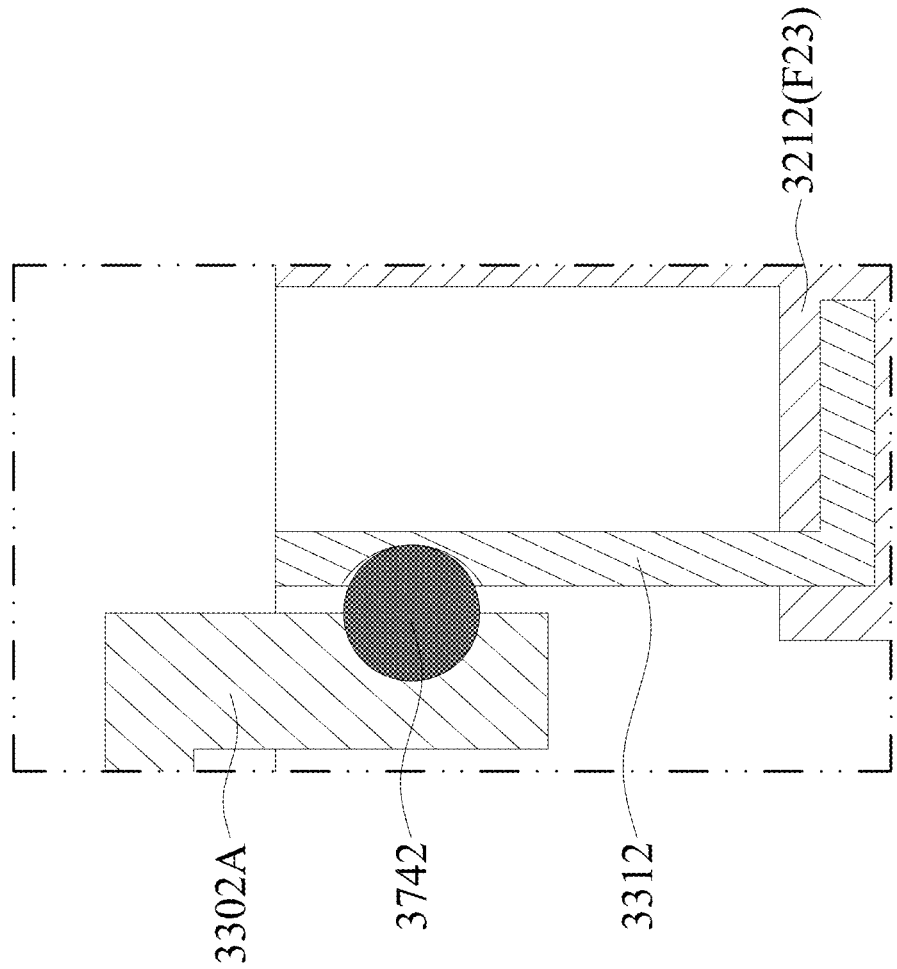
FIG. 11 is an enlarged view of the portion R13 in FIG. 10.

FIG. 11 is an enlarged view of the portion R13 in FIG. 10. In some embodiments, the connecting element 3312 may be affixed to the base 3212, the movable portion 3302 may be connected to the base 3212 (the fixed portion F23) through the connecting element 3312 and moved relative to the fixed portion F23. In detail, extending portions 3302A are positioned at the sides of the movable portion 3302, and the extending portions 3302A extends to the base 3212. A recess is formed on the extending portion 3302A, another recess is formed on the connecting element 3312, and a friction element 3742 may be disposed on the recesses of the extending portion 3302A and the connecting element 3312. As shown in FIG. 11, the recesses may have half-spherical shapes, so the spherical friction element 3742 may roll in the recesses, and the friction between the movable portion 3302 and the fixed portion F23 may be reduced. As a result, the movable portion 3302 may rotate using the connection of the two friction elements 3742 as a rotational axis, and the optical module 3902 disposed on the movable portion 3302 may be moved with the movable portion 3302 to achieve, for example, optical image stabilization (OIS).

Figure 9:
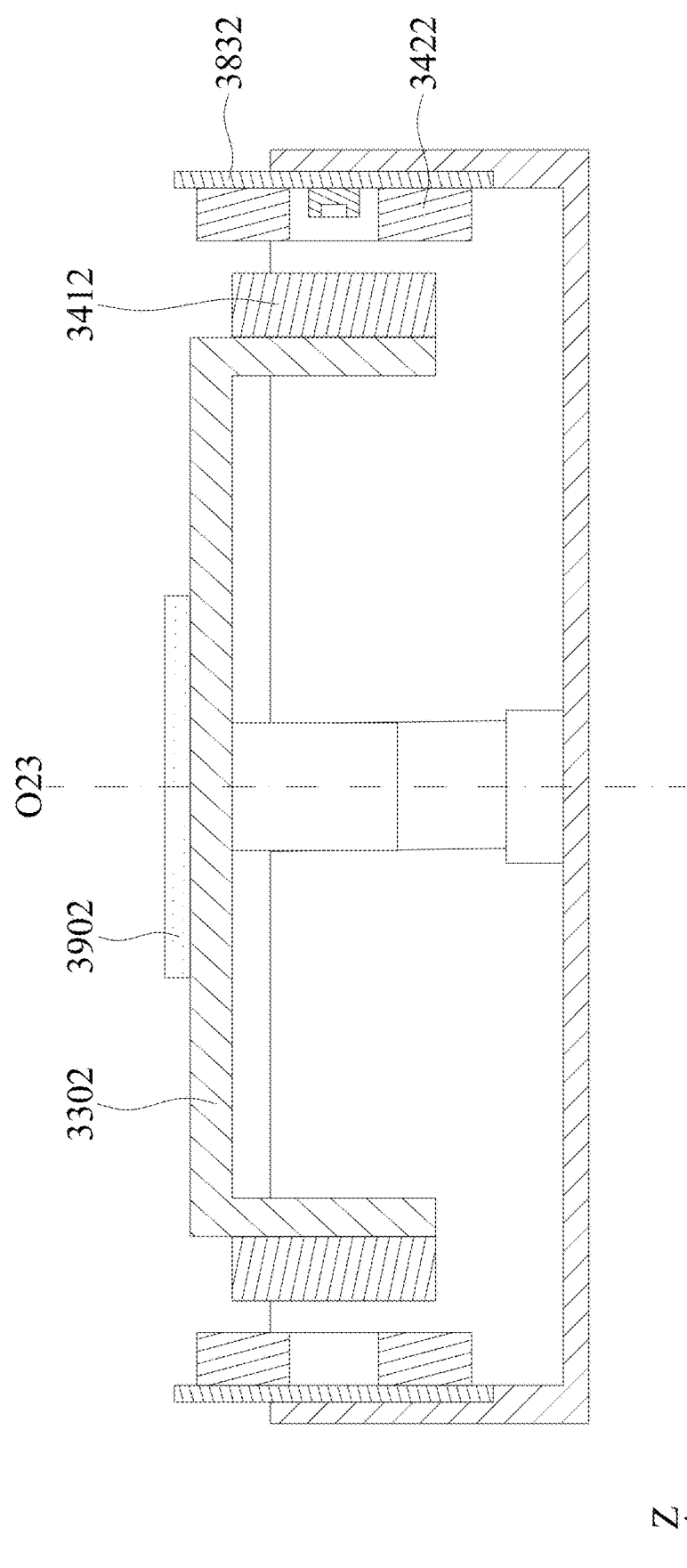
FIG. 9 is a cross-sectional view of the optical element driving mechanism.

In some embodiments, the first magnetic element 3412 and the second magnetic element 3422 may serve as a driving assembly D23 to drive the movable portion 3302 to move relative to the fixed portion F23. For example, the first magnetic element 3412 and the second magnetic element 3422 may include a combination of a driving coil and a driving magnet. For example, the first magnetic element 3412 may be a driving magnet, and the second magnetic element 3422 may be a driving coil. In another example, the first magnetic element 3412 may be a coil, and the second magnetic element 3422 may be a driving magnet, and is not limited thereto. The first magnetic element 3412 and the second magnetic element 3422 may be positioned on the fixed portion F23 and the movable portion 3302, respectively. In some embodiments, the positions of the fixed portion F23 and the movable portion 3302 may be interchanged, depending on design requirement. For example, as shown in FIG. 8 and FIG. 9, a sidewall 3302B may be positioned on the movable portion 3302 and extending to the base 3212, and the first magnetic element 3412 or the second magnetic element 3422 may be affixed to the sidewall 3302B by, for example, adhesion.

In some embodiments, the first magnetic element 3412 may extend in a direction that is perpendicular to the main axis O23, such as the Y axis, to allow the movable portion 3302 rotate relative to Y axis. In some embodiments, as shown in FIG. 9, the driving assembly D23 and the optical module 3902 do not overlap each other in a direction that is perpendicular to the main axis O23. It should be noted that the interaction between the first magnetic element 3412 and the second magnetic element 3422 may create a magnetic force to move the optical module 3902 relative to the fixed portion F23, so optical image stabilization (OIS) may be achieved.

In some embodiments, magnetic permeable elements 3832 may be provided corresponding to the first magnetic element 3412 and the second magnetic element 3422. The material of the magnetic permeable element 3832 may include metal to enhance the electromagnetic driving force between the first magnetic element 3412 and the second magnetic element 3422. In some embodiments of the present disclosure, the magnetic permeable element 3832 may be affixed to the base 3212 (the fixed portion F23) by, for example, adhesion.

In some embodiments, a position sensor 3432 may be disposed in the optical element driving mechanism 3102, such as disposed on the fixed portion F23, to detect the position of the movable portion 3302 relative to the fixed portion F23. The position sensor 3432 may include Hall sensor, magnetoresistance effect sensor (MR Sensor), giant magnetoresistance effect sensor (GMR sensor), tunneling magnetoresistance effect sensor (TMR sensor), or fluxgate sensor. In some embodiments, a plurality of position sensors 3432 may be provided, and the first magnetic element 3412, the second magnetic element 3422, and the position sensors 3432 may be arranged in the X axis.

Figure 12:
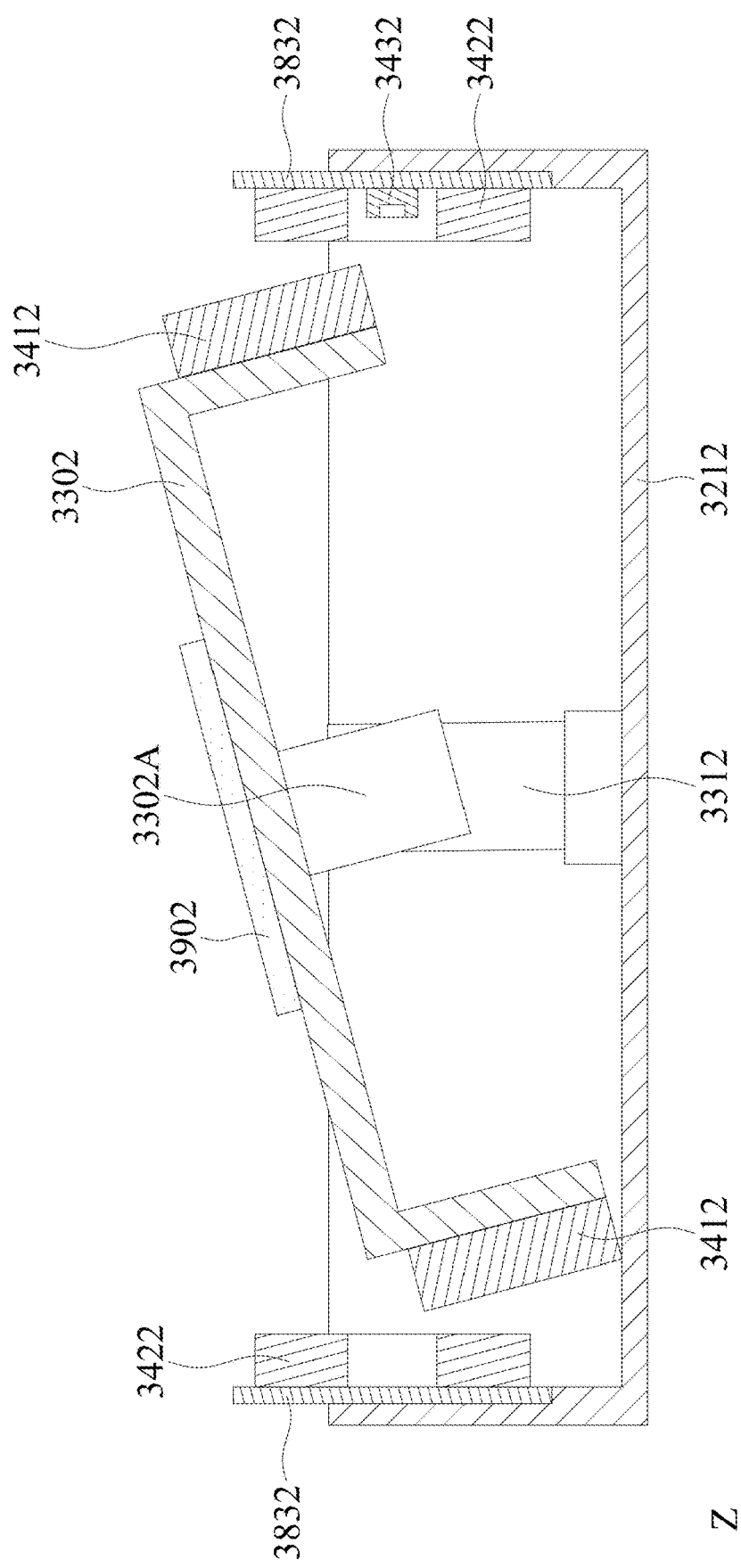
FIG. 12 is a schematic view of the optical element driving mechanism when the optical element driving mechanism is operating.

FIG. 12 is a cross-sectional view of the movable portion 3302 of the optical element driving mechanism 3102 and other elements disposed on the movable portion 3302 when these elements rotate in Y axis relative to the fixed portion F23. As shown in FIG. 12, the movable portion 3302 and the optical module 3902 disposed on the movable portion 3302 may use a combination of the spherical friction element 3742 and the recesses as fulcrums to rotate by the force generated from the driving assembly D23.

Figure 13:
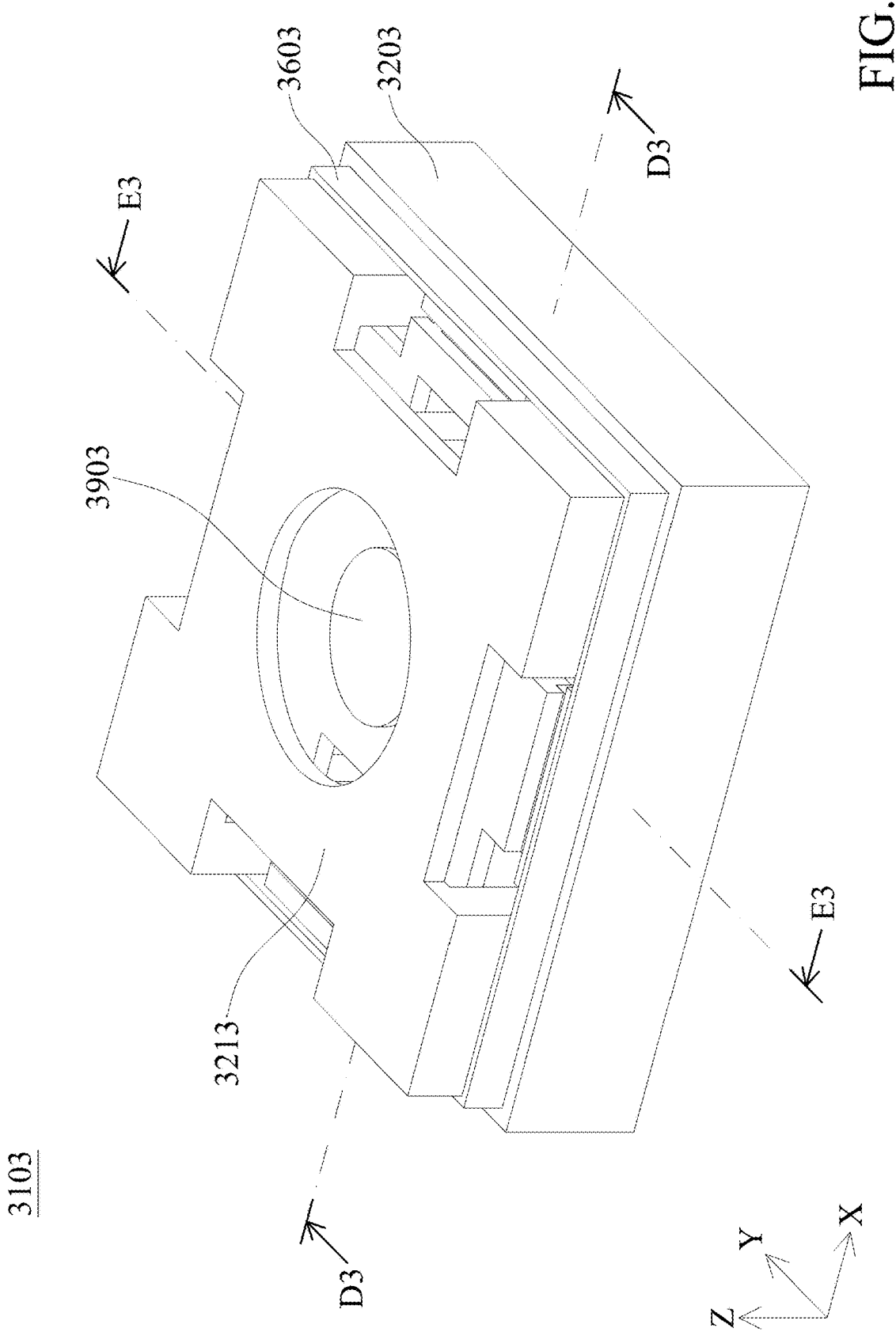
FIG. 13 is a perspective view of an optical element driving mechanism in some embodiments of the present disclosure.
Figure 14:
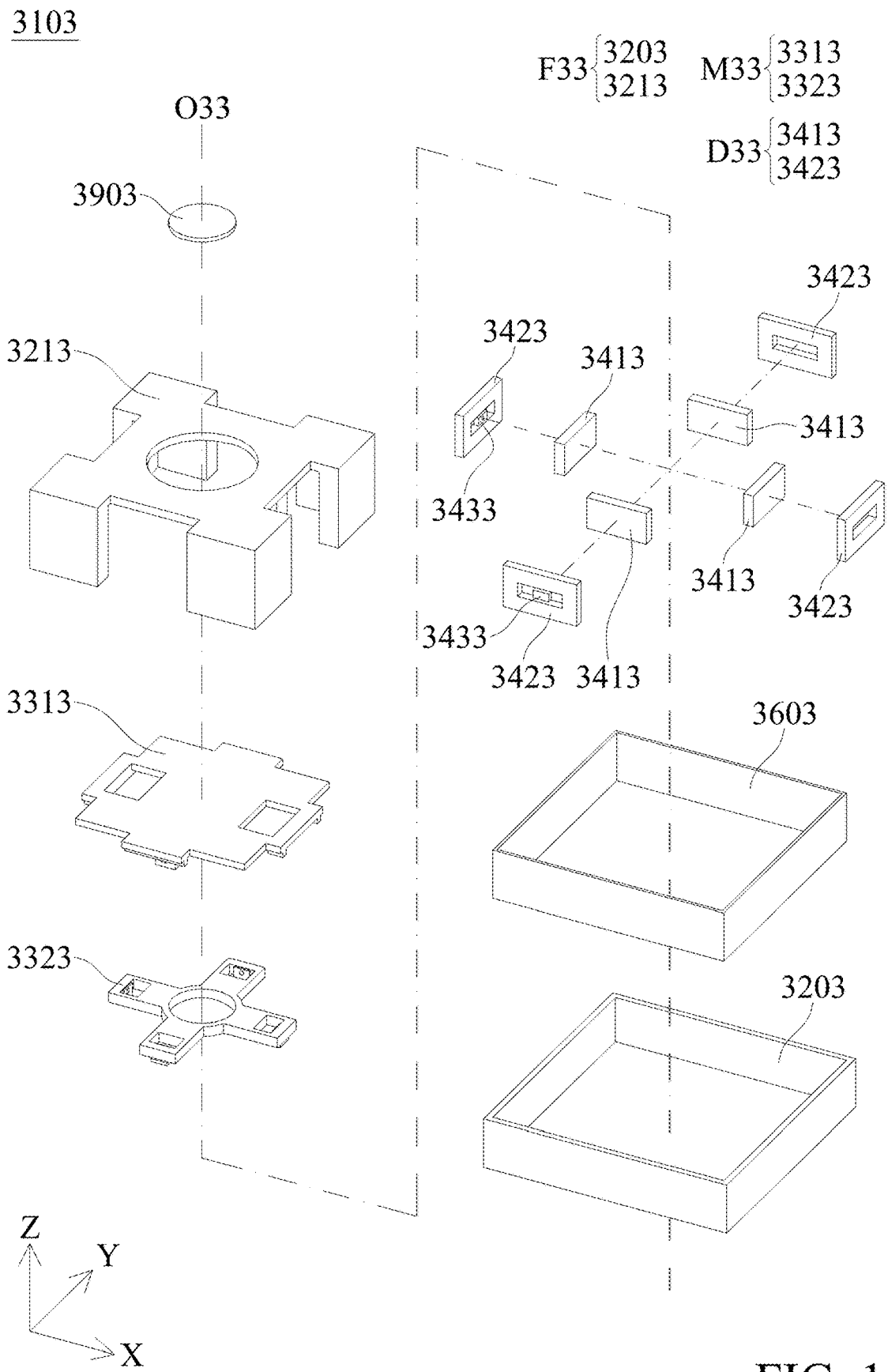
FIG. 14 is an exploded view of the optical element driving mechanism.

In some embodiments of the present disclosure, FIG. 13 to FIG. 16 are a perspective view and an exploded view of an optical element driving mechanism 3103, a cross-sectional view illustrated along a line D3-D3 in FIG. 13, and a cross-sectional view illustrated along a line E3-E3 in FIG. 13, respectively. In FIG. 13, the optical element driving mechanism 3103 mainly includes a fixed portion F33 (includes a case 3203 and a base 3213), a first movable portion 3313, a second movable portion 3323, a first magnetic element 3413, and a second magnetic element 3423, and a circuit board 3603. The optical element driving mechanism 3103 may be used for driving an optical module 3903, or it may be used for driving various optical elements, such as a lens, a mirror, a prism, a beam splitter, or an aperture.

In some embodiments, the first movable portion 3313 and the second movable portion 3323 may serve as a movable portion M33, and the first movable portion 3313 and the second movable portion 3323 may be moved relative to the fixed portion F33. In other words, the movable portion M33 is movable relative to the fixed portion F33. In some embodiments, the second movable portion 3323 may be moved relative to the first movable portion 3313, and the moving directions of the first movable portion 3313 and the second movable portion 3323 are different (such as rotatable relative to different axes). As a result, the optical module 3903 may move with the movable portion M33 to achieve auto focus (AF) or optical image stabilization (OIS).

In some embodiments, the first magnetic element 3413 and the second magnetic element 3423 may serve as a driving assembly D33 to drive the movable portion 3303 to move relative to the fixed portion F33. For example, the first magnetic element 3413 and the second magnetic element 3423 may include a combination of a driving coil and a driving magnet. For instance, the first magnetic element 3413 may be a driving magnet, and the second magnetic element 3423 may be a driving coil. In another example, the first magnetic element 3413 may be a driving coil, and the second magnetic element 3423 may be a driving magnet, and the present disclosure is not limited thereto. The first magnetic element 3413 and the second magnetic element 3423 may be positioned on the fixed portion F33 and the movable portion M33, respectively. In some embodiments, the positions of the fixed portion F33 and the movable portion M33 may be interchanged, depending on design requirement.

In some embodiments, the first magnetic element 3413 may extend in a direction that is perpendicular to the main axis O33, such as the X axis or Y axis, to allow the movable portion M33 rotate relative to the X axis or Y axis. It should be noted that the interaction between the first magnetic element 3413 and the second magnetic element 3423 may create a magnetic force to move the optical module 3903 relative to the fixed portion F33, so optical image stabilization (OIS) may be achieved.

In some embodiments, a position sensor 3433 may be disposed in the optical element driving mechanism 3103 to detect the position of the movable portion M33 relative to the fixed portion F33, such as disposed on the fixed portion F33. The position sensor 3433 may include Hall sensor, magnetoresistance effect sensor (MR Sensor), giant magnetoresistance effect sensor (GMR sensor), tunneling magnetoresistance effect sensor (TMR sensor), or fluxgate sensor.

Figure 15:
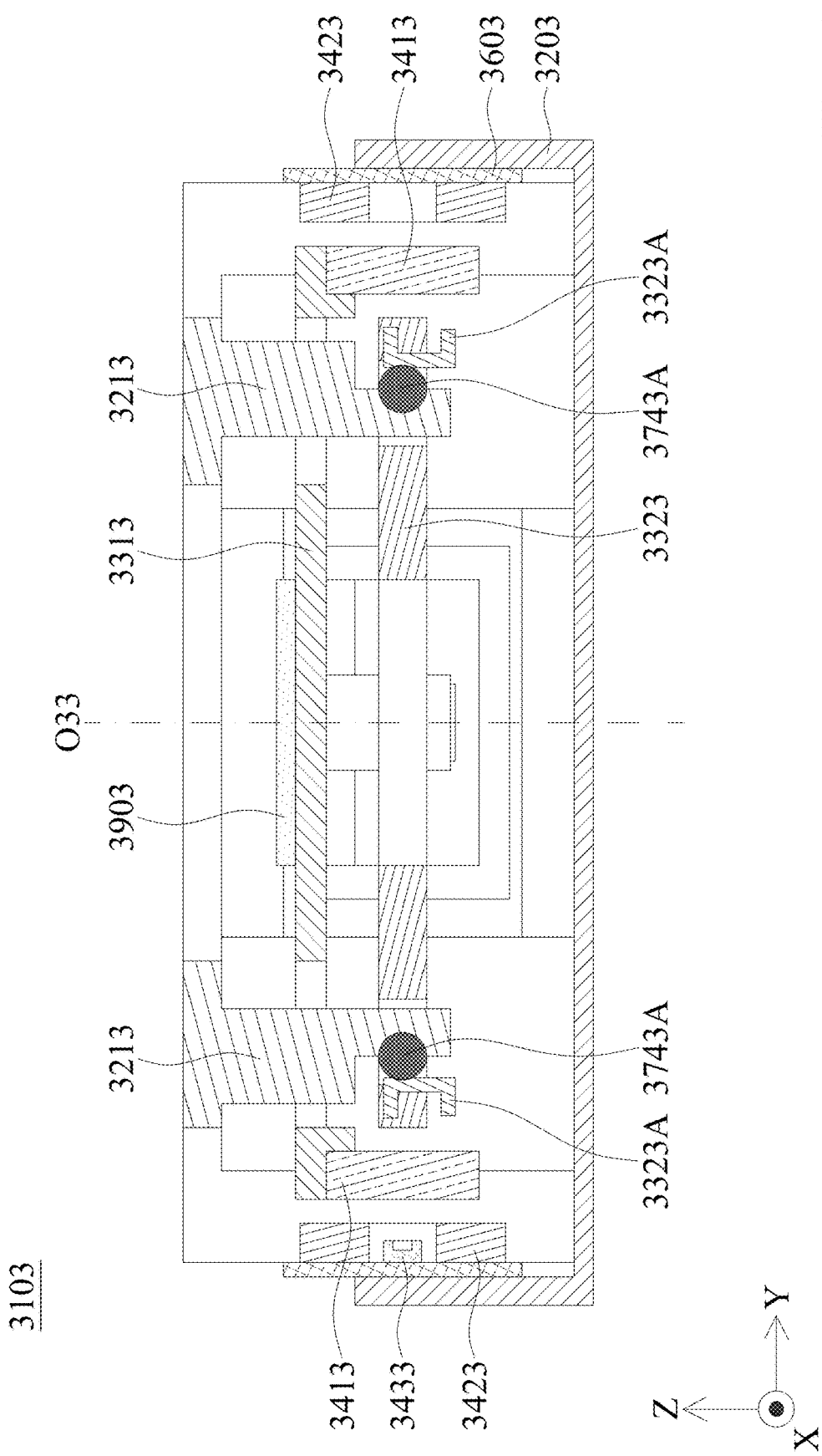
FIG. 15 is a cross-sectional view of the optical element driving mechanism.
Figure 16:
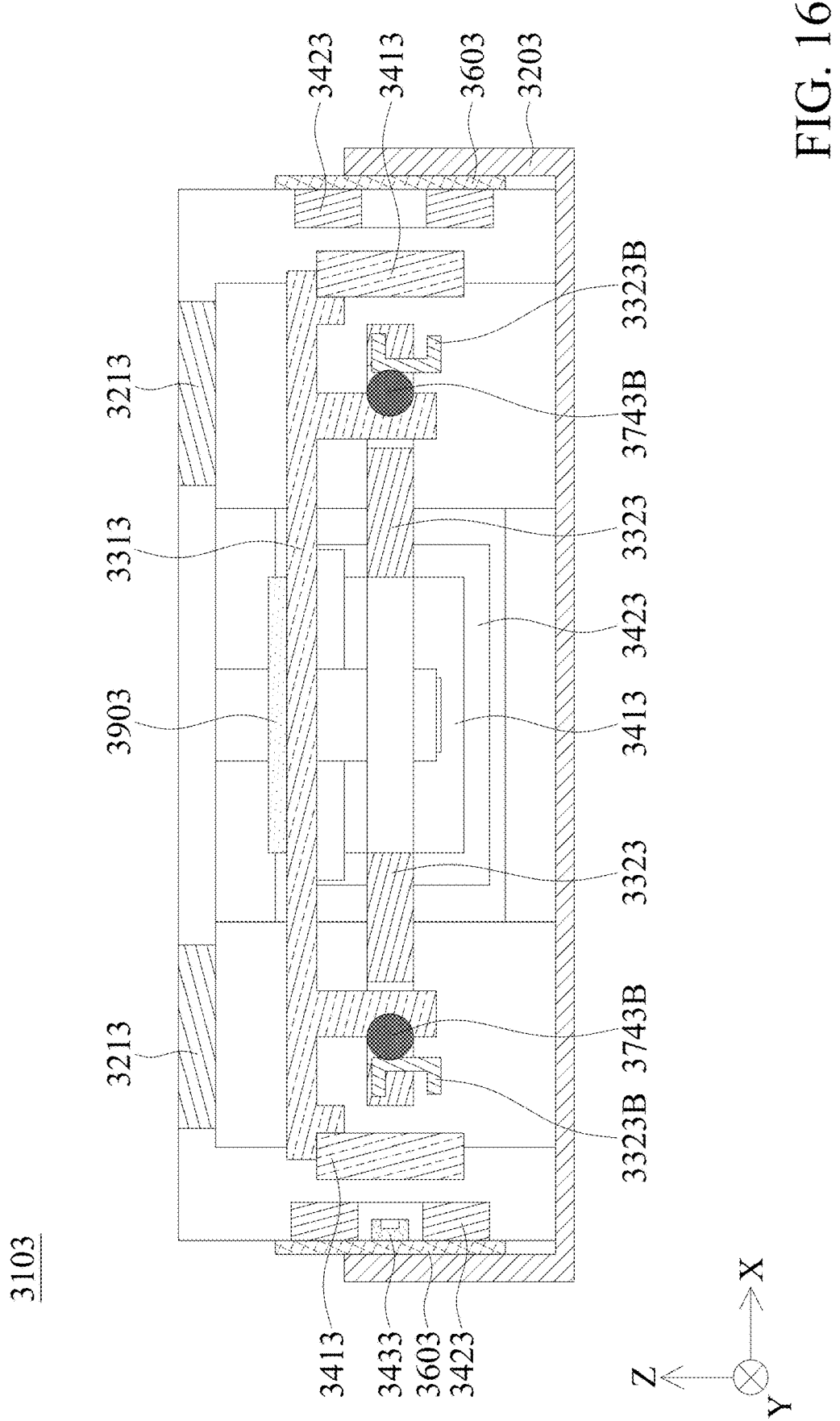
FIG. 16 is a cross-sectional view of the optical element driving mechanism.

As shown in FIG. 15 and FIG. 16, a connecting element 3323A and a connecting element 3323B may be positioned on the second movable portion 3323, wherein the connecting element 3323A is connected to the base 3213 through the spherical friction element 3743A, and the connecting element 3323B is connected to the first movable portion 3313 through the friction element 3743B. In particular, the friction element 3743A may be disposed in recesses of the connecting element 3323A and the base 3213, and the friction element 3743B may be disposed in recesses of the connecting element 3323B and the first movable portion 3313. As a result, the friction element 3743A and the friction element 3743B may roll in the recesses to allow the second movable portion 3323 moving relative to the first movable portion 3313, and to allow the second movable portion 3323 to move relative to the base 3213. In other words, the movable portion M33 (includes the first movable portion 3313 and the second movable portion 3323) may move relative to the fixed portion F33 by friction contact. As a result, the optical element driving mechanism may be operated after overcoming the maximum static friction between the elements, and required electricity for operation may be reduced.

Figure 17:
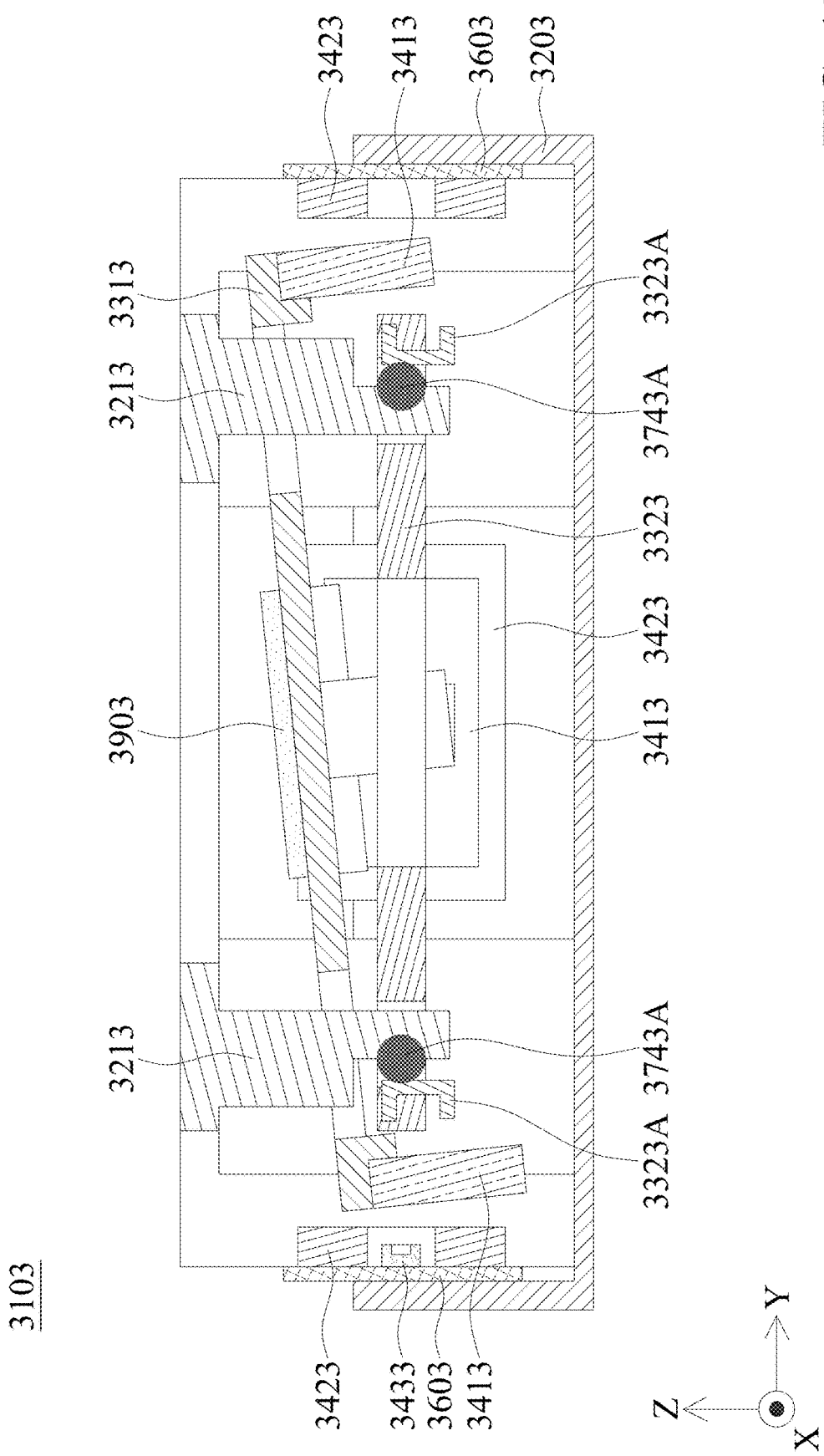
FIG. 17 is a schematic view of the optical element driving mechanism when the optical element driving mechanism is operating.

FIG. 17 is a cross-sectional view of the movable portion M33 of the optical element driving mechanism 3103 and other elements disposed on the movable portion M33 when these elements rotate in X axis relative to the fixed portion F33. As shown in FIG. 17, the movable portion M33 and the optical module 3903 disposed on the movable portion M33 may use the friction element 3743B (FIG. 16) as fulcrum to rotate by the force generated from the driving assembly D33. Although the embodiment in FIG. 17 only shows the movable portion M33 rotating in a single axis, but it should be noted that the movable portion M33 may rotate in more than one axes, such as X, Y, and Z axes, to achieve optical image stabilization (OIS).

Figure 18:
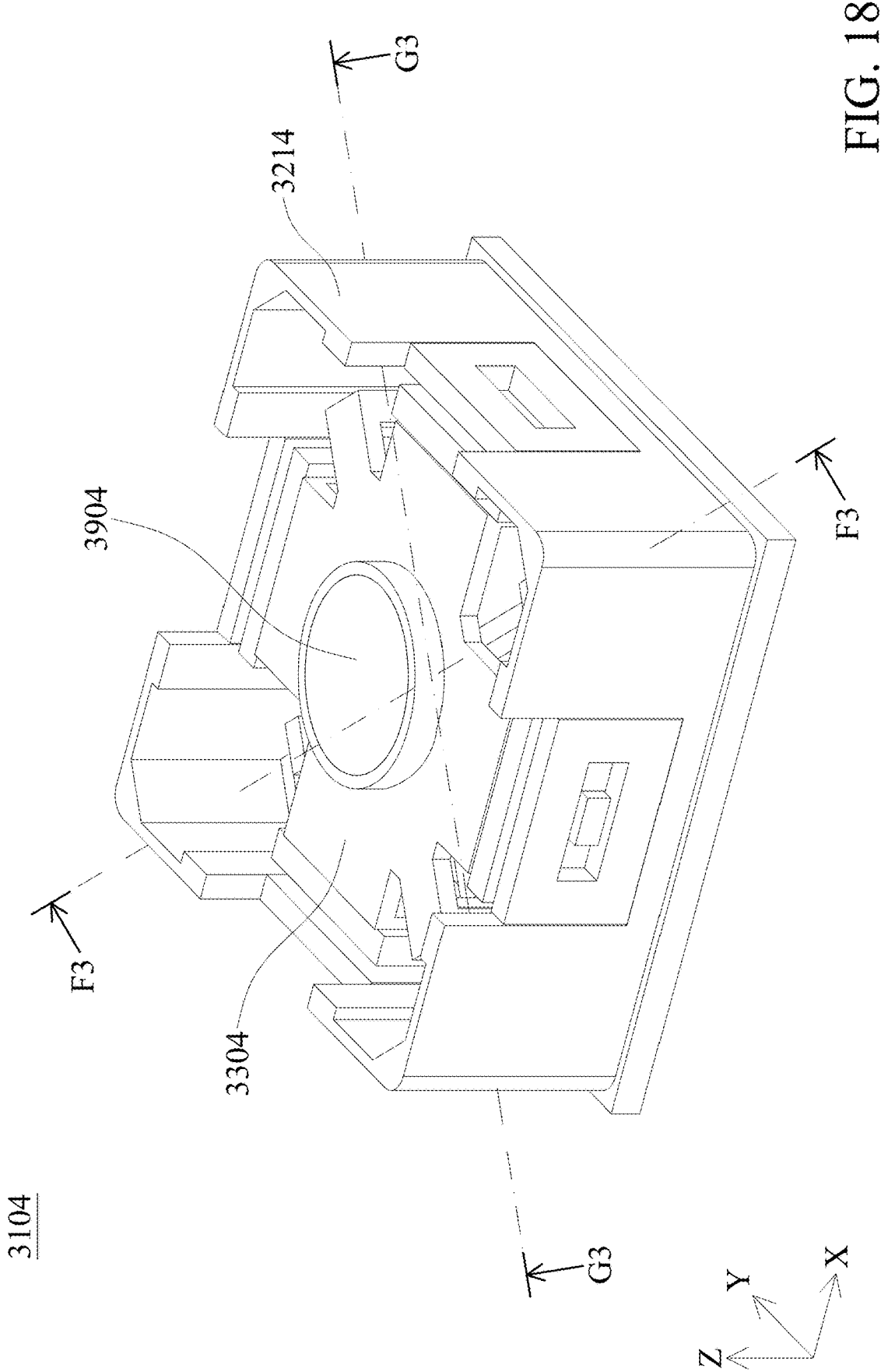
FIG. 18 is a perspective view of an optical element driving mechanism in some embodiments of the present disclosure.
Figure 19:
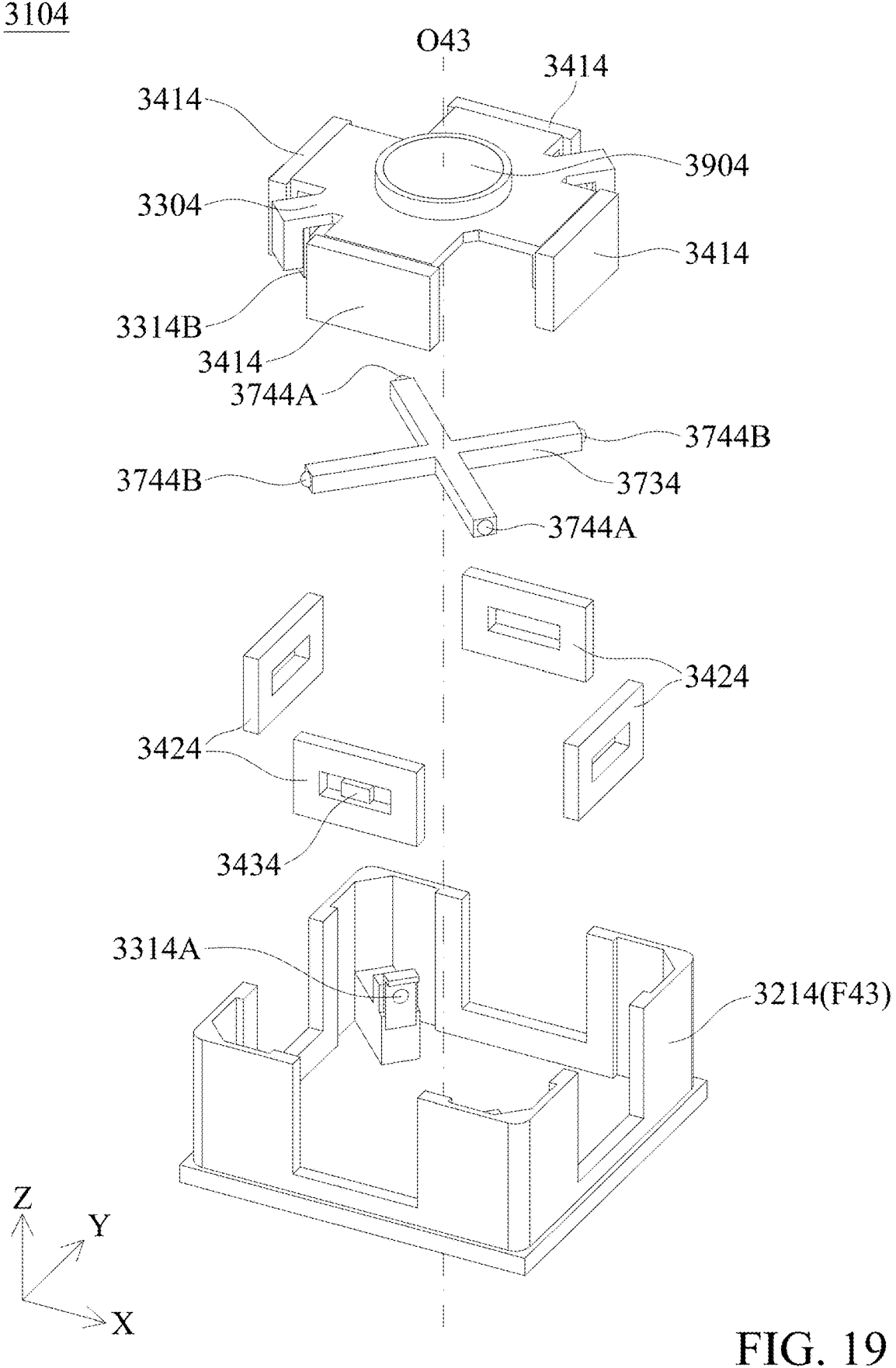
FIG. 19 is an exploded view of the optical element driving mechanism.

In some embodiments of the present disclosure, FIG. 18 to FIG. 21 are a perspective view and an exploded view of an optical element driving mechanism 3104, a cross-sectional view illustrated along a line F3-F3 in FIG. 18, and a cross-sectional view illustrated along a line G3-G3 in FIG. 18, respectively. In FIG. 18, the optical element driving mechanism 3104 mainly includes a base 3214 (fixed portion F43), a movable portion 3304, a first magnetic element 3414, and a second magnetic element 3424, and a rotate element 3734. The optical element driving mechanism 3104 may be used for driving an optical module 3904, or it may be used for driving various optical elements, such as a lens, a mirror, a prism, a beam splitter, or an aperture.

Figure 22:
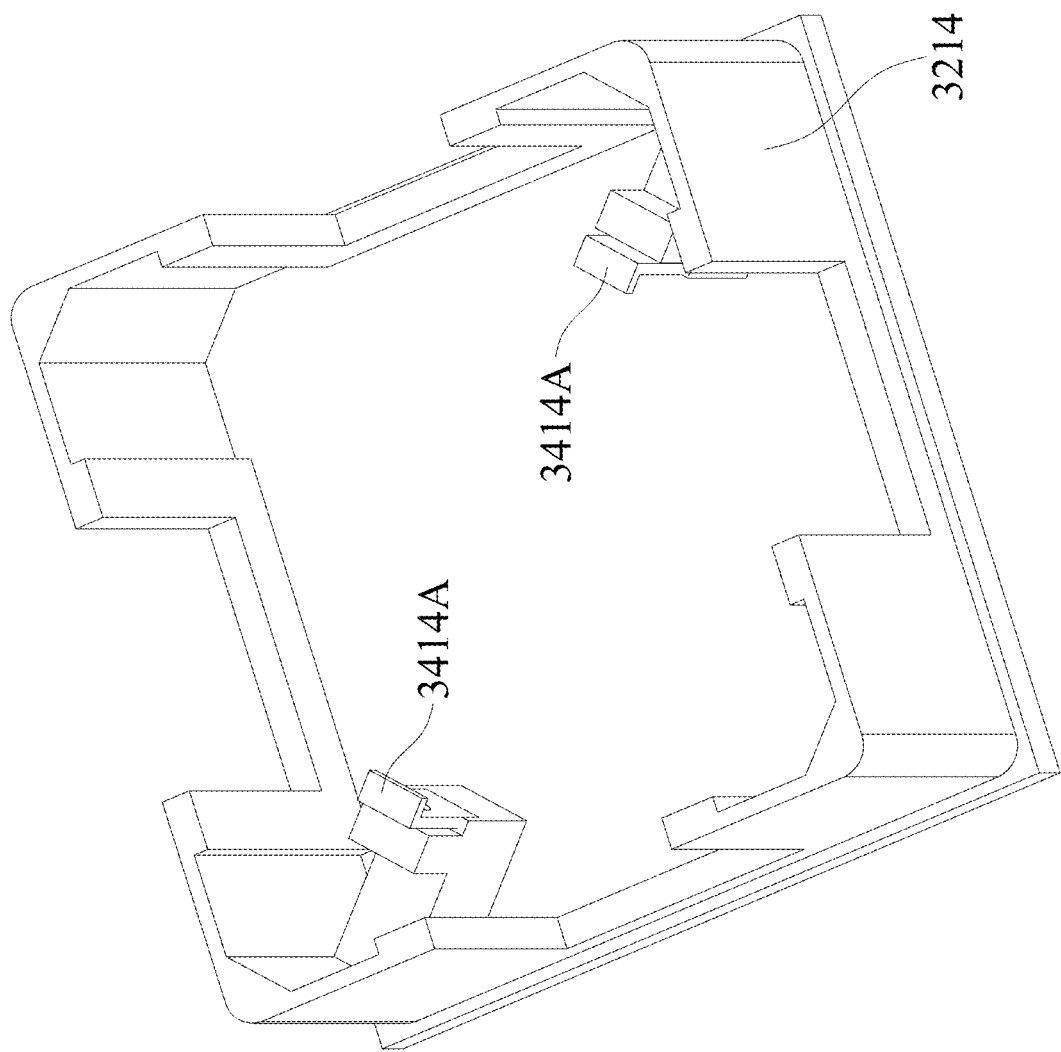
FIG. 22 is a schematic view of the base.
Figure 23:
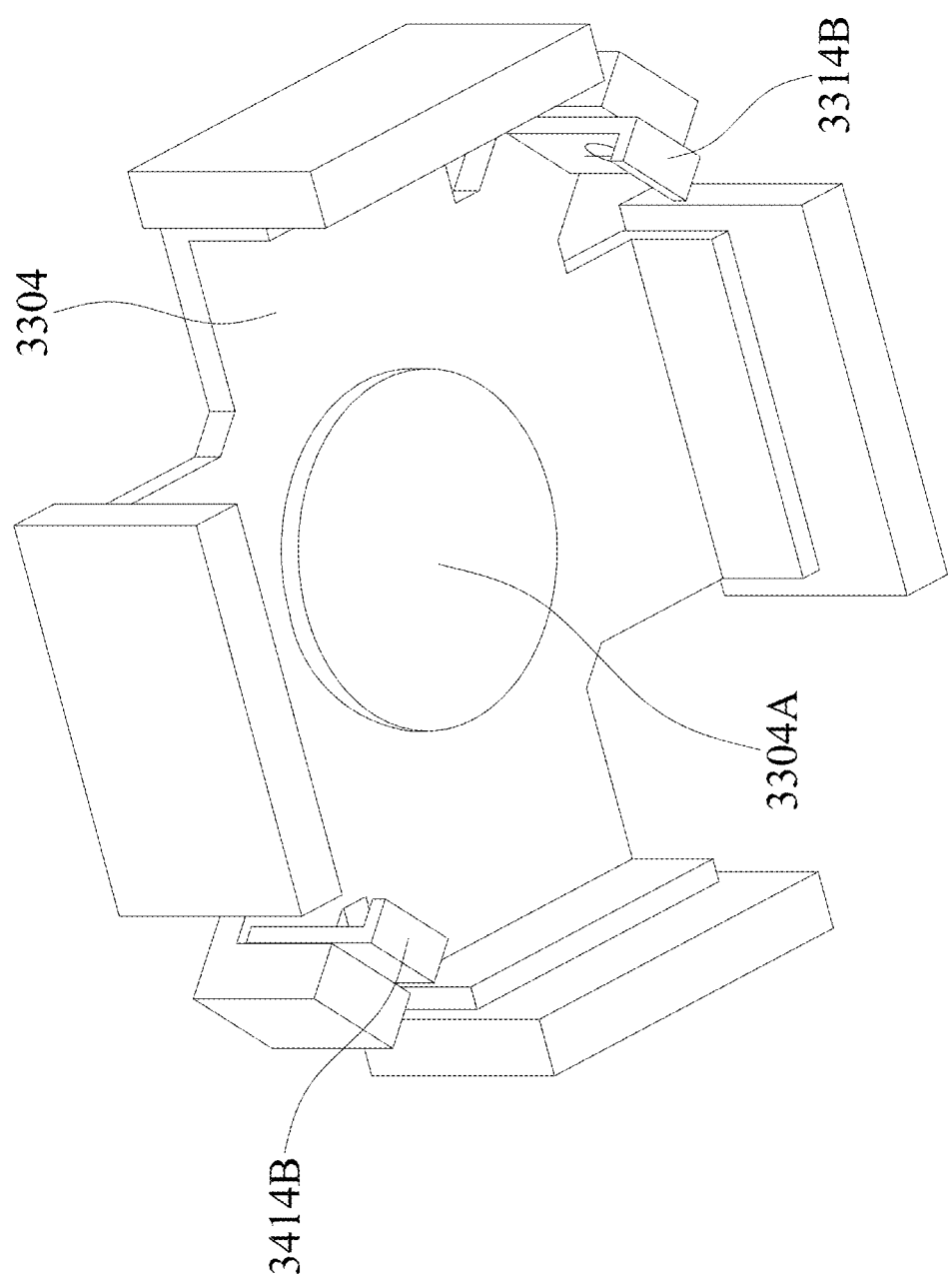
FIG. 23 is a schematic view of the movable portion.

FIG. 22 is a schematic view of the base 3214, and FIG. 23 is a schematic view of the movable portion 3304. In some embodiments, a connecting element 3314A may be affixed to the base 3214, and a connecting element 3314B may be affixed to the movable portion 3304. For example, the connecting element 3314A may be partially embedded in the base 3214, and the connecting element 3314 may be partially embedded in the movable portion 3304 to fix their position. A rotate element 3734 may has a criss-cross shape, and may be connected to the connecting element 3314A and the connecting element 3314B. A stopping portion 3304A may be positioned at a side of the movable portion 3304 that faces the connecting element 3743, the stopping portion 3304A protrudes from the movable portion 3304, and is used for restrict the moving range of the movable portion 3304 relative to the fixed portion F43. In some embodiments, the shape of the stopping portion 3304A may be symmetrical to the main axis O43, such having a circular shape, to balance the moving range of the movable portion 3304 in different directions.

Figure 21:
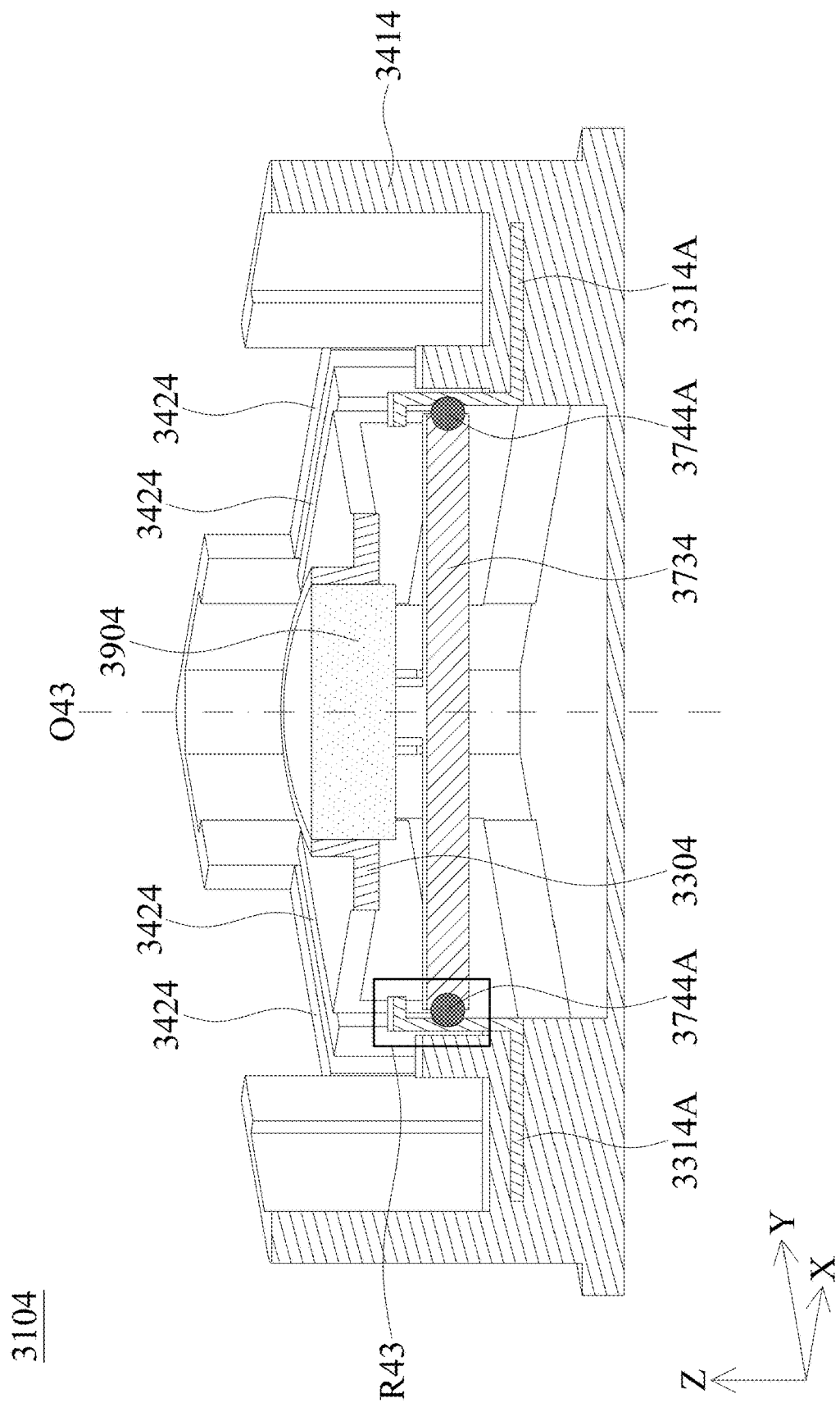
FIG. 21 is a cross-sectional view of the optical element driving mechanism.
Figure 24:
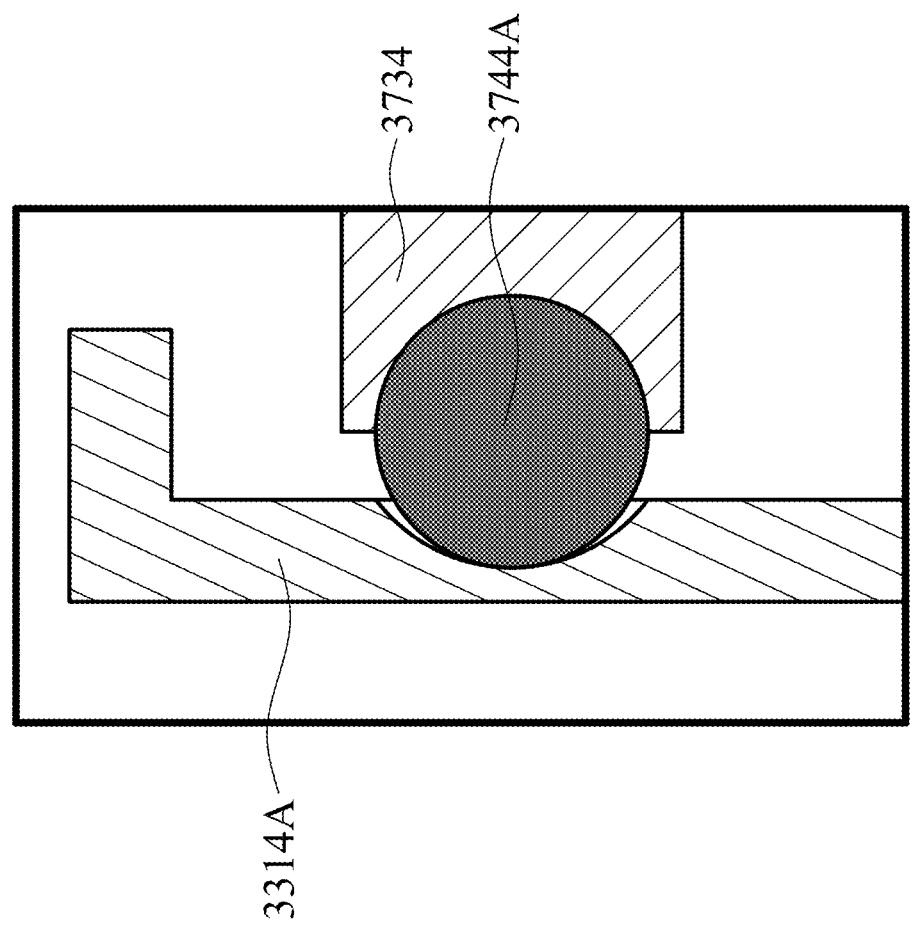
FIG. 24 is an enlarged view of the portion R43 in FIG. 21.

FIG. 24 is an enlarged view of the region R43 in FIG. 21. In detail, a recess is formed at the end of the rotate element 3734, another recess is formed on the connecting element 3314A, and the spherical friction element 3744A and the friction element 3744B may be disposed in the recesses to allow the rotate element 3734 to rotate relative to the connecting element 3314A by friction contact. As a result, the rotate element 3734 may rotate relative to the base 3214 by using a connection of the two friction elements 3744A as a rotation axis, such as the line F3-F3 in FIG. 18.

Figure 20:
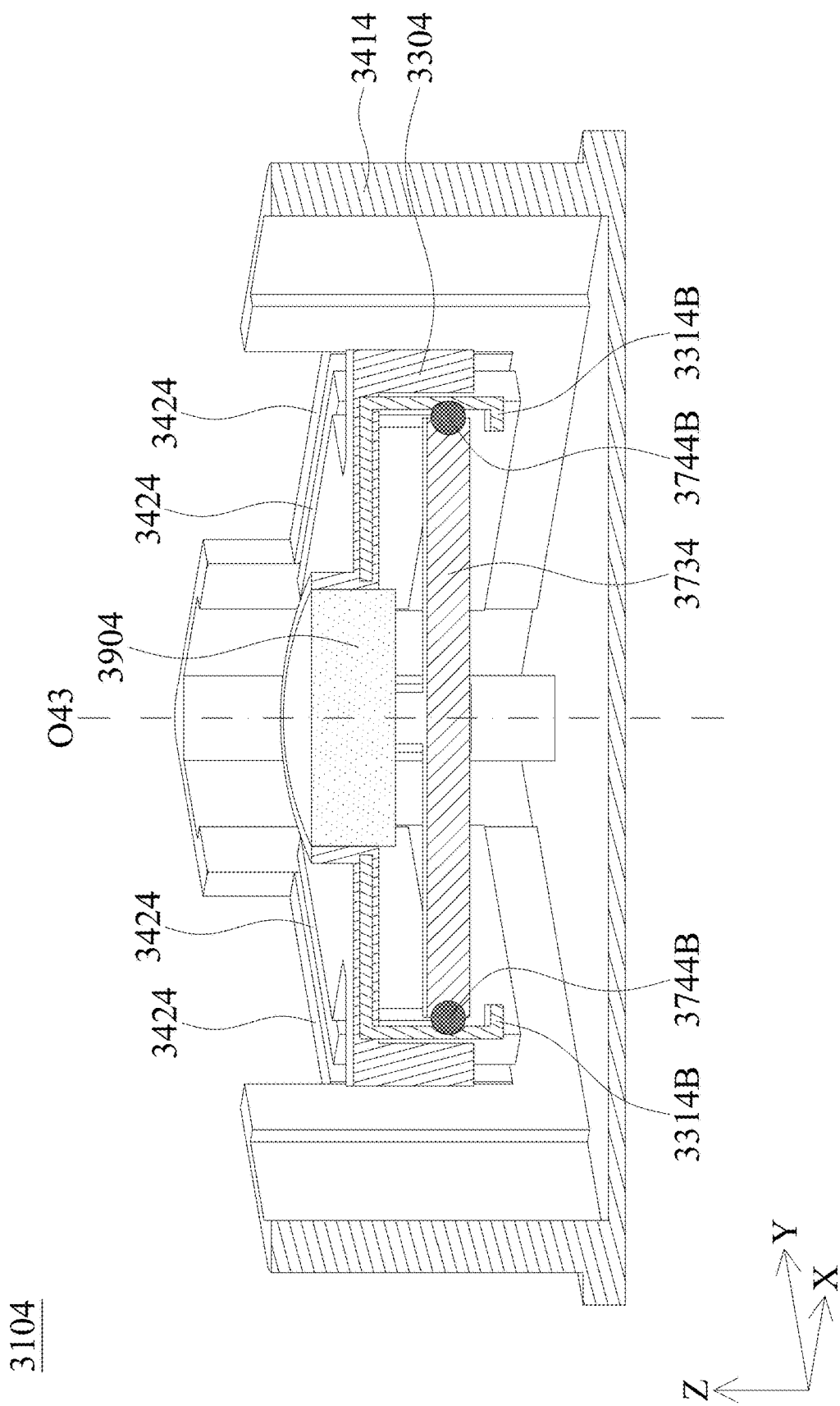
FIG. 20 is a cross-sectional view of the optical element driving mechanism.

Furthermore, as shown in FIG. 20, recesses may be formed on the connecting element 3314B, and the friction elements 3744B positioned on other two ends of the rotate element 3734 may be positioned in the recesses of the connecting element 3314B. Similarly, the rotate element 3734 may rotate relative to the movable portion 3304 by using a connection of the two friction elements 3744B as a rotation axis, such as the line G3-G3 in FIG. 18. In some embodiments, the friction elements 3744A and the friction elements 3744B may be formed as one piece with the rotate element 3734, so the required number of elements may be reduced to facilitate assembling.

In other words, the movable portion 3304 may move relative to the base 3214 (the fixed portion F43) through the rotate element 3734. As a result, the optical module 3904 disposed on the movable portion 3304 may be moved with the movable portion 3304, so optical image stabilization (OIS) may be achieved.

In some embodiments, the first magnetic element 3414 and the second magnetic element 3424 may serve as a driving assembly D43 to drive the movable portion 3304 to move relative to the fixed portion F43. For example, the first magnetic element 3414 and the second magnetic element 3424 may include a combination of a driving coil and a driving magnet. For example, the first magnetic element 3414 may be a driving magnet, and the second magnetic element 3424 may be a driving coil. In another example, the first magnetic element 3414 may be a coil, and the second magnetic element 3424 may be a driving magnet, and is not limited thereto. The first magnetic element 3414 and the second magnetic element 3424 may be positioned on the fixed portion F43 and the movable portion M43, respectively. In some embodiments, the position of the fixed portion F43 and the position of the movable portion M43 are interchangeable, depending on design requirement.

In some embodiments, the first magnetic element 3414 may extend in a direction that is perpendicular to the main axis O43, such as the X axis or Y axis, to allow the movable portion 3304 rotate relative to the X axis or Y axis. It should be noted that the interaction between the first magnetic element 3414 and the second magnetic element 3424 may create a magnetic force to move the optical module 3904 relative to the fixed portion F43, so optical image stabilization (OIS) may be achieved.

In some embodiments, a position sensor 3434 may be disposed in the optical element driving mechanism 3104 to detect the position of the movable portion 3304 relative to the fixed portion F43, such as disposed on the fixed portion F43. The position sensor 3434 may include Hall sensor, magnetoresistance effect sensor (MR Sensor), giant magnetoresistance effect sensor (GMR sensor), tunneling magnetoresistance effect sensor (TMR sensor), or fluxgate sensor.

Figure 25:
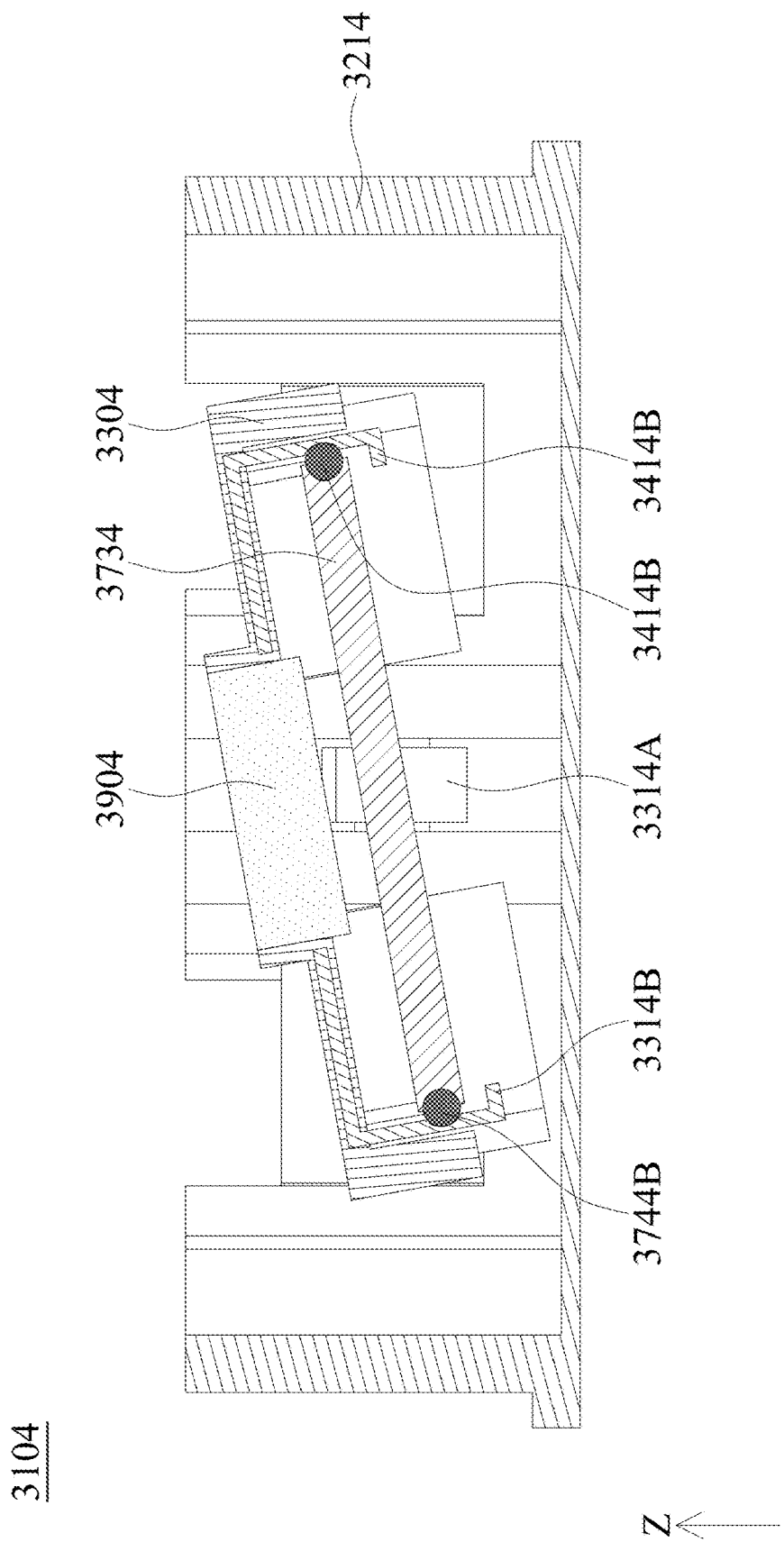
FIG. 25 is a schematic view of the optical element driving mechanism when the optical element driving mechanism is operating.

FIG. 25 is a cross-sectional view of the movable portion 3304 of the optical element driving mechanism 3104 and other elements disposed on the movable portion 3304 when these elements rotate relative to the fixed portion F43. As shown in FIG. 25, the movable portion 3304 and the optical module 3904 disposed on the movable portion 3304 may use a combination of the rotate element 3734, the friction element 3744A, the connecting element 3314A, the friction element 3744B, and the connecting element 3314B as fulcrums to rotate relative to the fixed portion F43 by the force generated from the driving assembly D43.

In summary, an optical element driving mechanism is provided. The optical element driving mechanism includes a movable portion, a fixed portion, a driving assembly, and a support element. The movable portion is used for connecting to an optical element having a main axis. The movable portion is movable relative to the fixed portion. The driving assembly is used for driving the movable portion to move relative to the fixed portion. The movable portion moves relative to the fixed portion through the support element. The design of the present disclosure provides the optical element with additional directions of motion, so the performance of the optical module is improved, and miniaturization can be achieved.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
    a movable portion used for connecting to an optical element having a main axis;
    a fixed portion comprising a base, wherein the movable portion is movable relative to the fixed portion;
    a driving assembly for driving the movable portion to move relative to the fixed portion;
    a support element disposed on a center of the base, wherein the movable portion moves relative to the fixed portion through the support element, and the main axis passes through the center of the base and the support element; and
    two resilient elements disposed on opposite sides of the fixed portion, wherein each of the resilient elements has a first connecting end disposed on the movable portion and a second connecting end disposed on the fixed portion, each of the resilient elements continuously extending to opposite ends of a side of the optical element driving mechanism, and the first connecting end and the second connecting end are positioned at the opposite ends of the side of the optical element driving mechanism.

2. The optical element driving mechanism as claimed in claim 1, wherein the driving assembly comprises:
    a first magnetic element, disposed on the movable portion; and
    a second magnetic element, disposed on the fixed portion.

3. The optical element driving mechanism as claimed in claim 2, wherein the first magnetic element extends in a direction that is perpendicular to the main axis.

4. The optical element driving mechanism as claimed in claim 1, wherein each of the resilient elements is S-shaped.

5. The optical element driving mechanism as claimed in claim 1, wherein each of the resilient elements is positioned on a plane that is parallel to the main axis.

6. The optical element driving mechanism as claimed in claim 1, wherein the fixed portion has a recess, and a portion of one of the resilient elements is partially disposed in the recess.

7. The optical element driving mechanism as claimed in claim 1, wherein the fixed portion has a top surface and a bottom surface, a minimum distance between the top surface and the movable portion is less than a minimum distance between the bottom surface and the movable portion, and a minimum distance between the bottom surface and one of the resilient elements is less than the minimum distance between the bottom surface and the movable portion.

8. The optical element driving mechanism as claimed in claim 1, wherein the resilient elements do not overlap the driving assembly when viewed along the main axis.

9. The optical element driving mechanism as claimed in claim 1, wherein the main axis is positioned between the two resilient elements.

10. The optical element driving mechanism as claimed in claim 1, wherein the driving assembly does not overlap the optical element when viewed in a direction that is perpendicular to the main axis.

11. The optical element driving mechanism as claimed in claim 1, further comprising a magnetic permeable element disposed in the fixed portion.

12. The optical element driving mechanism as claimed in claim 11, wherein the driving assembly comprises:
    a first magnetic element, disposed on the movable portion; and
    a second magnetic element, disposed on the fixed portion, and the magnetic permeable element, the first magnetic element, and the second magnetic element at least partially overlap each other along the main axis.

13. The optical element driving mechanism as claimed in claim 1, further comprising at least two position sensors disposed on the fixed portion or the movable portion.

14. The optical element driving mechanism as claimed in claim 1, wherein the fixed portion further comprises a case, and the movable portion is disposed in the case.

15. The optical element driving mechanism as claimed in claim 1, wherein the support element is spherical, and is connected to the movable portion and the fixed portion.

16. The optical element driving mechanism as claimed in claim 15, wherein the movable portion has a recess, the fixed portion has a concave portion, and the support element is partially disposed in the recess of the movable portion and in the concave portion of the fixed portion.

17. The optical element driving mechanism as claimed in claim 16, wherein the fixed portion comprises a convex portion extending to the movable portion, and the concave portion is positioned in the convex portion.

18. The optical element driving mechanism as claimed in claim 17, wherein the driving assembly comprises:
- a first magnetic element, disposed on the movable portion; and
- a second magnetic element, disposed on the fixed portion, and a distance between the second magnetic element and the movable portion is less than a distance between the convex portion and the movable portion.

\* \* \* \* \*